US012801953B2

(12) United States Patent
Lewin et al.

(10) Patent No.: US 12,801,953 B2
(45) Date of Patent: Nov. 17, 2026

(54) METHODS AND SYSTEMS OF ACCESSING SENSOR-BASED DRIVING DATA

(71) Applicant: CAMBRIDGE MOBILE TELEMATICS INC., Cambridge, MA (US)

(72) Inventors: Matthew Evan Lewin, Lexington, MA (US); Yuting QI, Lexington, MA (US); Joseph Patrick Adelmann, Lexington, MA (US); William Abildgaard, Jr., Waltham, MA (US); Ankit Singhania, Somerville, MA (US); Edward Gelberg, Ashland, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 1087 days.

(21) Appl. No.: 17/379,682

(22) Filed: Jul. 19, 2021

(65) Prior Publication Data

US 2022/0019924 A1 Jan. 20, 2022

Related U.S. Application Data

(60) Provisional application No. 63/053,980, filed on Jul. 20, 2020.

(51) Int. Cl.
*H04W 4/021* (2018.01)
*G06N 7/01* (2023.01)
(Continued)

(52) U.S. Cl.
CPC .................................... *G06N 7/01* (2023.01)

(58) Field of Classification Search
CPC ........................................................ G06N 7/01
See application file for complete search history.

(56) References Cited

U.S. PATENT DOCUMENTS 8,396,662 B1 3/2013 Siira et al.
9,644,986 B2 5/2017 Kumagai
(Continued)

FOREIGN PATENT DOCUMENTS

CN 107492251 A 12/2017
CN 110837600 A 2/2020
(Continued)

OTHER PUBLICATIONS

PCT/US2021/042285, "International Preliminary Report on Patentability", Feb. 2, 2023, 8 pages.
(Continued)

*Primary Examiner* — Nhat Huy T Nguyen
(74) *Attorney, Agent, or Firm* — Kilpatrick Townsend & Stockton LLP

(57) ABSTRACT

Techniques are disclosed for accessing sensor-based driving data that includes detecting a waking event associated with an application and activating the application in response to detecting the waking event. Activity data for a recorded time interval preceding the waking event may be used to detect a missed trip by: identifying a first time in which the activity data indicates a high probability of automotive activity and identifying a second time in which the activity data indicates a low probability of automotive activity, wherein the second time instant occurs after the first time. The missed trip may correspond to a first time interval that extends between the first time and the second time. Sensor data may then be received for a second time interval that begins prior to the first time and ends after the second time.

24 Claims, 7 Drawing Sheets

(51) Int. Cl.

| | |
|---|---|
| ***G06N 20/00*** | (2019.01) |
| ***H04W 4/02*** | (2018.01) |
| ***H04W 4/029*** | (2018.01) |
| ***H04W 4/38*** | (2018.01) |
| ***H04W 4/40*** | (2018.01) |

(56) References Cited

U.S. PATENT DOCUMENTS

| | | | | |
|---|---|---|---|---|
| 10,373,257 | B1 * | 8/2019 | Iqbal | G06Q 40/08 |
| 10,785,604 | B1 | 9/2020 | Kumar et al. | |
| 10,902,521 | B1 | 1/2021 | Kanevsky | |
| 11,069,159 | B1 | 7/2021 | Brinkmann et al. | |
| 12,282,327 | B2 * | 4/2025 | Coleman | G08G 1/096775 |
| 2013/0289819 | A1 | 10/2013 | Hassib et al. | |
| 2014/0081483 | A1 | 3/2014 | Weinmann et al. | |
| 2014/0278574 | A1 | 9/2014 | Barber | |
| 2015/0079923 | A1 | 3/2015 | Mcneil | |
| 2016/0189442 | A1 | 6/2016 | Wright | |
| 2016/0282156 | A1 | 9/2016 | Ott et al. | |
| 2016/0328893 | A1 | 11/2016 | Cordova et al. | |
| 2016/0375908 | A1 | 12/2016 | Biemer | |
| 2017/0053461 | A1 * | 2/2017 | Pal | G08G 1/012 |
| 2017/0115125 | A1 | 4/2017 | Outwater et al. | |
| 2017/0265044 | A1 | 9/2017 | Lundsgaard et al. | |
| 2017/0279957 | A1 | 9/2017 | Abramson et al. | |
| 2017/0289341 | A1 | 10/2017 | Rodriguez et al. | |
| 2019/0027038 | A1 | 1/2019 | Chintakindi et al. | |
| 2019/0208384 | A1 | 7/2019 | Matus et al. | |
| 2020/0193170 | A1 * | 6/2020 | Braybrook | B60R 11/04 |
| 2020/0334160 | A1 | 10/2020 | Zhang et al. | |
| 2020/0342235 | A1 | 10/2020 | Tsai et al. | |
| 2021/0142419 | A1 | 5/2021 | Davis et al. | |
| 2021/0311209 | A1 | 10/2021 | Hagiwara et al. | |
| 2021/0318129 | A1 * | 10/2021 | Solano | G01C 21/3407 |
| 2022/0048432 | A1 | 2/2022 | Switalski et al. | |
| 2023/0008460 | A1 | 1/2023 | Mungo | |
| 2023/0214930 | A1 * | 7/2023 | Smith | G06Q 30/0207 705/4 |
| 2024/0087037 | A1 * | 3/2024 | Sanchez | G06Q 30/0211 |
| 2024/0314528 | A1 | 9/2024 | Silver et al. | |

FOREIGN PATENT DOCUMENTS

| | | | |
|---|---|---|---|
| CN | 111144446 | A | 5/2020 |
| EP | 3744601 | B1 | 4/2024 |
| EP | 3507787 | B1 | 8/2024 |
| EP | 4005252 | B1 | 1/2025 |
| EP | 3588373 | B1 | 6/2025 |
| WO | 2012080741 | A1 | 6/2012 |
| WO | 2020128455 | A2 | 6/2020 |

OTHER PUBLICATIONS

EP21847351.0, "Extended European Search Report", Jul. 23, 2024, 8 pages.

PCT/US2021/042285, "International Search Report and Written Opinion", Nov. 5, 2021, 9 pages.

U.S. Appl. No. 17/569,372, "Non-Final Office Action", Oct. 1, 2024, 56 pages.

U.S. Appl. No. 17/569,372, "Final Office Action", May 8, 2025, 38 pages.

U.S. Appl. No. 17/569,372, "Non-Final Office Action", Sep. 30, 2025, 63 pages.

EP21847351.0, "Office Action", Sep. 19, 2025, 5 pages.

"English Translation of CN 107492251 A", Dec 19, 2017, 157 pages.

"English Translation of CN 110837600 A", Feb. 25, 2020, 64 pages.

U.S. Appl. No. 17/569,372, "Final Office Action", Mar. 19, 2026, 76 pages.

* cited by examiner

METHODS AND SYSTEMS OF ACCESSING SENSOR-BASED DRIVING DATA

CROSS-REFERENCE TO RELATED APPLICATION

This application claims priority to U.S. Provisional Patent Application No. 63/053,980, filed on Jul. 20, 2020, entitled "Methods and Systems of Accessing Sensor-Based Driving Data," the disclosure of which is hereby incorporated by reference in its entirety for all purposes.

BACKGROUND OF THE INVENTION

Modern mobile devices include a number of sensors operable to measure characteristics of an environment of the mobile device. Despite the progress made in the area of using mobile devices to collect and process data, there is a need in the art for improved methods and systems related to collecting and processing sensor data of a mobile device.

SUMMARY OF THE INVENTION

Embodiments of the present invention generally relate to detecting drive data, and more particularly, to detecting driving data while a data collection application is suspended or terminated.

A first method is disclosed for accessing sensor-based driving data. The first method comprises: detecting a waking event associated with an application stored on a mobile device; activating the application in response to detecting the waking event; receiving, from a cache memory of the mobile device, activity data for a recorded time interval preceding the waking event; and detecting, using the activity data, a missed trip by: identifying, from the activity data, a first time in which the activity data indicates a high probability of automotive activity; identifying, from the activity data, a second time in which the activity data indicates a low probability of the automotive activity, wherein the second time instant occurs after the first time; determining that the missed trip occurred over a first time interval that extends between the first time and the second time; and receiving, in response to determining that the missed trip occurred over the first time interval, sensor data for a second time interval that begins prior to the first time and ends after the second time, the sensor data being stored in association with an indication of the missed trip.

A second method is disclosed for accessing sensor-based driving data. The second method comprises: detecting a waking event associated with an application stored on a mobile device, the waking event indicating that a drive has been initiated; activating, in response to detecting the waking event; receiving, from a cache memory of the mobile device, first sensor data from a first sensor, the first sensor data including measurements from the first sensor collected during a recorded time interval that preceded the waking event; receiving, by the application, second sensor data from one or more second sensors after the waking event, the second data including measurements from the one or more second sensors collected after the waking event; generating a set of sensor signals from the first sensor data and the second sensor data; extracting from the set of sensor signals one or more statistical features; and executing a classifier using the one or more statistical features to generate a prediction of a characteristic of the drive. The generated prediction of the characteristics of the drive may correspond to: a speed of a vehicle, a vehicle collision during the drive, and/or a behavior of a driver during the drive.

Another aspect of the present disclosure includes a system comprising one or more processors and a non-transitory computer-readable medium storing instructions which, when executed by the one or more processors, configure the system to: detect a waking event associated with an application stored on a mobile device; activate the application in response to detecting the waking event; receive, from a cache memory of the mobile device, activity data for a recorded time interval preceding the waking event; and detect, using the activity data, a missed trip by: identifying, from the activity data, a first time in which the activity data indicates a high probability of automotive activity; identifying, from the activity data, a second time in which the activity data indicates low probability of automotive activity, wherein the second time occurs after the first time; determining that the missed trip occurred over a first time interval that extends between the first time and the second time; and receiving, in response to determining that the missed trip occurred over the first time interval, sensor data for a second time interval that begins prior to the first time and ends after the second time, the sensor data being stored in association with an indication of the missed trip.

Another aspect of the present disclosure includes a non-transitory computer-readable medium storing instructions, which, when executed by the one or more processors, cause the one or more processors to perform the first method and/or the second method described above.

Numerous benefits are achieved by way of the present invention over conventional techniques. For example, embodiments of the present invention identify missed drives that occurred while a data collection application was not executing. In addition, resource consumption (e.g., power, processing, bandwidth, etc.) associated with the continuous collection of sensor data may be reduced by enabling data collection applications to collect sensor data even when the data collection application is not executing. Thus, resources of the mobile device can be conserved without losing access to sensor data of the mobile device.

Further areas of applicability of the present invention will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION OF SPECIFIC EMBODIMENTS

Figure 1:
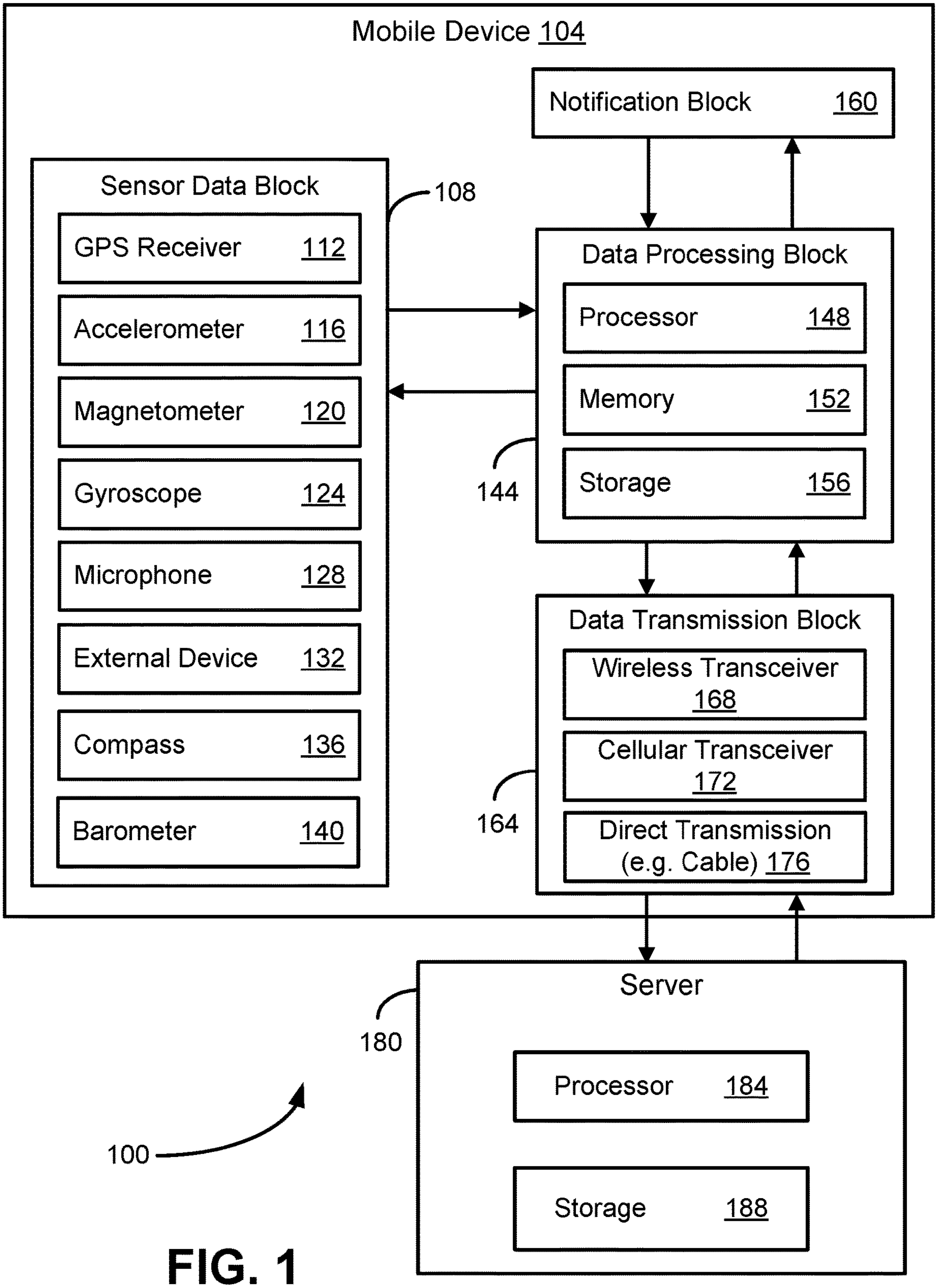
FIG. 1 depicts an exemplary block diagram illustrating the sensor and processing components of a mobile device for which mounted usage may be detected according to some embodiments.

Embodiments of the present invention generally relate to detecting drive data, and more particularly, to detecting driving data while a data collection application is suspended or terminated.

An application executing on the mobile device uses an application programming interface to access measurements of the sensors of the mobile device. Generally, when the application is not executing, the mobile device does not store the measurements of the sensors. Thus, if an application is to collect sensor data corresponding to a specific event, but does not have information on when the specific event is to occur, the application must typically remain executing for an extended duration of time to capture the sensor data corresponding to the event. This can cause a significant drain on the resources of the mobile device in terms of processing cycles and power. In addition, during the extended duration of execution, the application will collect a large quantity of sensor data that does not correspond to the specific event, thereby collecting large amounts of superfluous sensor data.

Embodiments of the present invention enable persistent collection of sensor data even when data collection applications are not executing (e.g., not loaded into memory) and/or are suspended (e.g., some or all of the processing threads of the application are paused). The data collection application transmits a request to an operating system for the collection of sensor data over a recorded time interval. In some instances, the operating system may collect sensor data from one or more sensors that are not accessible to the data collection application (e.g., a sensor reserved for the operating system). In other instances, the operating system may collect sensor data from some or all sensors of the mobile device (e.g., including those accessible to the data collection application). The data collection application then terminates or enters a suspended state and the operating system collects and caches sensor data over the recorded time interval.

Detection of a waking event may activate the data collection application (e.g., to execute or return from the suspended state). The waking event may indicate that the mobile device is positioned in a car during a drive. The data collection application begins collecting sensor data from one or more sensors of the mobile device for the duration of the drive. Since a delay between the beginning of the drive and the detection of the waking event may cause some sensor data associated with the drive to be lost, the data collection application requests sensor data from the operating system for a time interval (e.g., a small time interval) that precedes (e.g., immediately precedes) the waking event (e.g., 1 minute, 5 minutes, 10 minutes, or the like). The data collection application adds the requested sensor data to the sensor data collected by the data collection application over the drive to ensure that the data collection application includes sensor data over the entire duration of the drive.

When the data collection application is activated, the data collection application analyzes the data collected by the operating system over the recorded time interval for a missed drive. A missed drive may be a drive that occurred while the data collection application was not executing. For example, if the mobile device failed to detect the waking event, the data collection application would not be activated to collect sensor data over that drive. The data collection application can detect missed drives by requesting activity data from the operating system. The activity data may be received from a cache memory of the operating system. Activity data may include a probability that an activity associated with the mobile device is occurring (e.g., walking, running, driving, cycling, flying, etc.) for each of one or more times over the recorded time interval. The data collection application identifies a first time as the earliest time in which the activity data indicates a high probability (or a probability that exceeds a threshold) that a drive occurred. The data collection application identifies a second time as the earliest time after the first time in which the activity data indicates a different activity occurred (e.g., such as any activity that is not a drive, or a low probability of automotive activity). The data collection application then defines a missed drive as occurring over a time interval that includes the first time and the second time. In some instances, to account for delays in detecting the activities (e.g., the sensor data detects the activity at some time interval after the activity initiated), the data collection application may define the missed drive as including a third time that is earlier than the first time (e.g., by 1 minute, 5 minutes, 10 minutes, or the like), and a fourth time that is equal to or later than the second time (e.g., by 1 minute, 5 minutes, 10 minutes, or the like).

FIG. 1 is a system diagram illustrating a system 100 for measuring device acceleration and detecting physical interaction according to some embodiments. System 100 includes a mobile device 104 that includes a plurality of processing, sensor, and communication resource components. Mobile device 104 may include a sensor data block 108, a data processing block 144, a data transmission block 164, and optionally a notification block 160. The sensor data block 108 includes data collection sensors as well as the data collected from sensors that is available to mobile device 104. This can include external devices connected via Bluetooth, universal serial bus (USB) cable, etc. The data processing block 144 may include storage 156 that may include data from the sensors of the sensor data block 108 processed by processor 148. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may include wireless transceiver 168, cellular transceiver 172, or direct transmission 176. Data transmission block 164 may process communications (e.g., transmitted and received communications) such as the processed sensor data transmitted to an external computing device (e.g., server 180). The external computing device may also store and/or process the data obtained from sensor data block 108. Server 180 may include its own processor 184 and storage 188.

Notification block 160 may report the results of analysis of sensor data performed by the data processing block 144 to a user of the mobile device 104 via a display (not shown). For example, notification block 160 may display or otherwise present a warning communication to a user of the mobile device 104 upon determining that the user may be a distracted driver. In some examples, the physical interaction determination may be a process executed by processor 148 of mobile device 104. In other examples, the physical interaction determination may be a process executed by processor 184, as described further herein with respect to FIG. 2.

Some embodiments are described using examples where driving data is collected using electronic devices, and these examples are not limited to any particular electronic device. As examples, a variety of electronic devices including sensors such as location determination systems such as global positioning system (GPS) receivers 112, accelerometers 116, magnetometers 120, gyroscopes 124, microphones 128, external (sensor) devices 132, compasses 136, barometers 140, communications capabilities, and the like may be included or connected to mobile device 104. Exemplary electronic devices include smart watches, fitness monitors, Bluetooth headsets, tablets, laptop computers, smart phones, music players, movement analysis devices, and the like.

One or more sensors of mobile device 104 (e.g., the sensors of sensor data block 108) may be operated to collect measurements to provide an indication as to physical interaction with the mobile device 104. In some examples, the measurements may be collected at a time when an electronic device is likely to be with the driver when operating a vehicle, such as when the device is moving with a particular speed or when the device is located on a known road (e.g., a highway). The sensors used to collect data may be components of the mobile device 104, and use power resources available to mobile device 104 components, e.g., mobile device battery power and/or a data source external to mobile device 104.

In some examples, settings of a mobile device may be used to enable different functions described herein. For example, an operating system (OS), such as Apple iOS, Android OS, and/or wearable device operating systems having certain settings enabled can enable certain functions of embodiments. In some examples, having location services enabled allows the collection of location information from the mobile device (e.g., collected by global positioning system (GPS) receiver 112), and enabling background app refresh allows some embodiments to execute in the background, collecting and analyzing driving data even when the application is not executing. In some instances, location information may be determined by other sensors of the mobile device such as tracking movement of the mobile device (e.g., using an accelerometer controlled by an operating system of the mobile device), by receiving location information from an external source, radio triangulation (e.g., using cellular or Wi-Fi radios), by an internet protocol (IP) address of the mobile device, or by other means. In some implementations, alerts are provided or surfaced using notification block 160 while the app is running in the background since various processing and data collection processes can be performed in the background.

Figure 2:
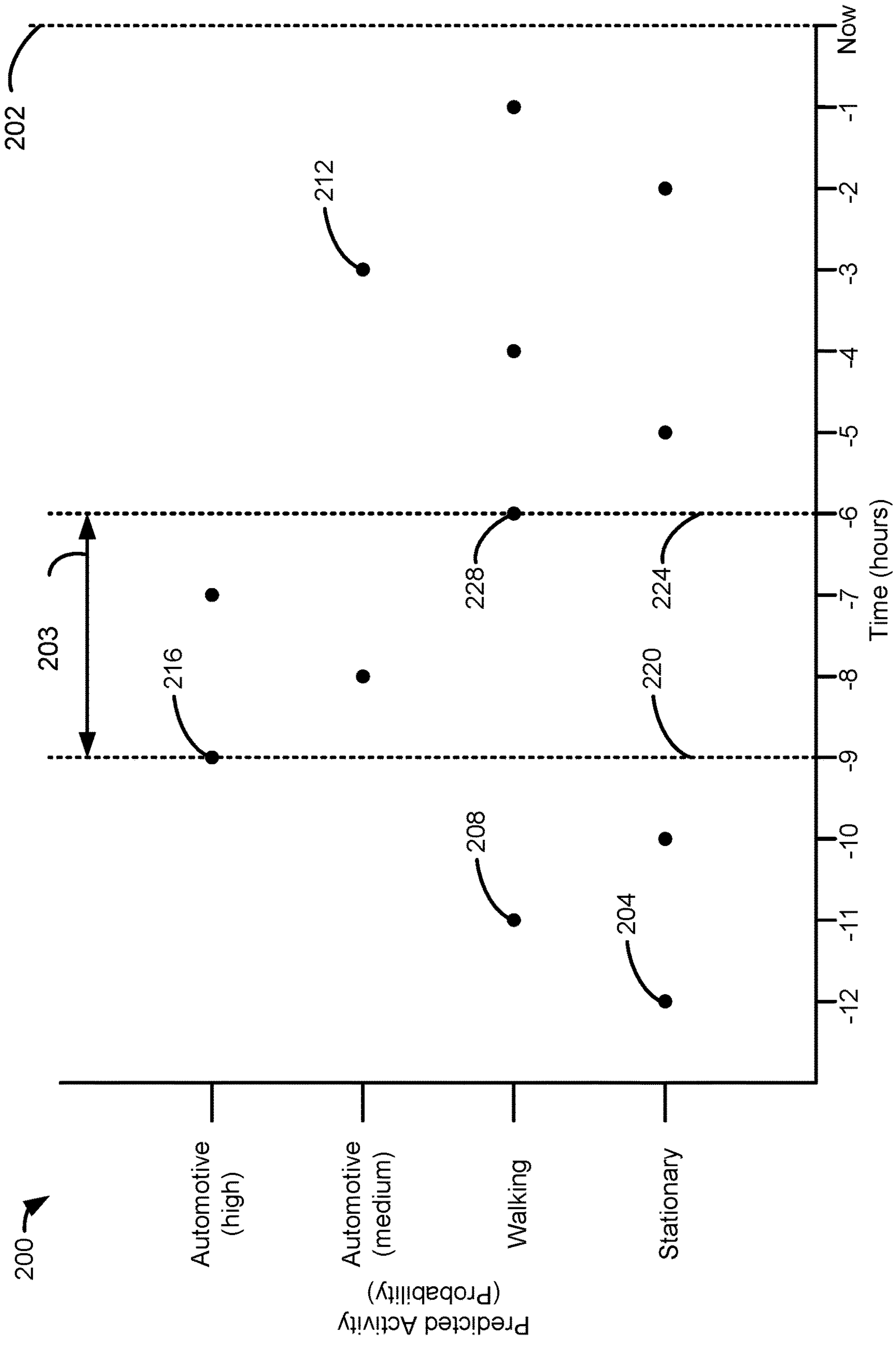
FIG. 2 is an exemplary representation of a graph data structure generated by an activity detection engine according to some embodiments.

FIG. 2 is an exemplary representation of a graph data structure 200 generated by an activity detection engine according to some embodiments. A data collection application executing on the mobile device collects measurements from one or more sensors (e.g., such as sensors from sensor data block 108 of FIG. 1). While executing, the data collection application may consume resources (e.g., processing, network bandwidth, power, and the like) of the mobile device. In some instances, the data collection application may only intend to capture sensor data that corresponds to a predetermined activity type (e.g., such as a drive or the like). Capturing sensor data of other activities (e.g., when the mobile device is stationary) may waste the resources of the mobile device. To reduce the resource consumption of applications of the mobile device, the operating system of the mobile device may capture and cache sensor data from some or all of the sensors of the mobile device over a predetermined, discrete time interval (e.g., twelve hours). When the data collection application executes (or returns from a suspended state), the data collection application may request the sensor data collected by the operating system over the preceding predetermined, discrete time interval (e.g., up to the preceding twelve hours) during which the data collection application was not executing.

The operating system of the mobile device may also generate a probability of a contemporaneous activity of the mobile device (e.g., a probability that the mobile device is with a user who is stationary, walking, running, driving, flying, or the like, or an otherwise low probability of automotive activity) over the predetermined, discrete time interval. The activity detection engine accesses the activity data generated by the operating system over the predetermined, discrete time interval and uses the activity data to identify potential missed drives (e.g., drives in which the data collection application did not obtain sensor data). The activity detection engine may access the activity data from a cache memory of the operating system. This prevents the data collection application from analyzing all of the sensor data over the predetermined time interval. Instead, the activity detection engine may identify the missed drive and collect the portion of the sensor data that corresponds to the missed drive.

In some instances, the data collection application may request that the operating system collect sensor data. The activity detection engine may indicate a time interval over which the sensor measurements are requested (e.g., up to a maximum allowed by the operating system, such as twelve hours). The operating system may then cache sensor data over the time interval while the data application is not executing (or is suspended). When the data collection application executes (or returns from suspension), the activity detection engine accesses the activity data collected by the operating system (e.g., through an application programming interface exposed by the operating system). The activity detection engine may access the activity data from a cache memory of the operating system. The data collection application may also generate a new request to the operating system to collect sensor data for a subsequent time interval such that the sensor data is always being collected, either by the data collection application (when executing), or the operating system (when the data collection application is not executing).

The activity detection engine generates a graph data structure using the activity data received from the operating system. The activity detection engine may access the activity data from a cache memory of the operating system. As previously described, the activity data includes, but is not limited to, an activity and a probability that the mobile device is involved in that activity, such as: stationary, walking (e.g., the mobile device is with a user who is walking), a low probability of automotive activity (e.g., a low probability that the mobile device is with a user that is driving), a medium probability of automotive activity (e.g., a medium probability that the mobile device is with a user who is driving), a high probability of automotive activity (e.g., a high probability that the mobile device is with a user that is driving), cycling (e.g., the mobile device is with a user that is cycling and therefore a low probability of automotive activity), and the like. Any activity may also be represented by the graph data structure such as those enumerated by a user (e.g., through user input or the like) or those detected by another application of the mobile device. The activity detection engine may receive identification of any quantity of activities over the preceding time interval. The activity detection engine may obtain an indication of an activity in regular intervals (e.g., by polling the operating system). Alternatively, the activity detection engine may receive an indication of an activity each time the operating system detects a new activity (e.g., push notification from the operating system).

In some instances, the activity detection engine may receive a probability (e.g., a confidence that the activity is occurring) for each of multiple activities. In those instances, the activity detection engine represents, in the graph data structure, the activity with the highest probability. Alternatively, the activity detection engine may represent only those activities with a probability that exceeds a threshold. For instance, the activity detection engine may only represent activities with a probability that exceeds 40% in the graph data structure. If no activities exceed the 40% threshold, the graph data structure may not include activities at that time (e.g., the activity may be represented as a null value). Alternatively, the data collection engine may represent all activities in the graph data structure with the corresponding probability of each activity.

The graph data structure 200 includes a preceding time interval of twelve hours from a wake event 202 (e.g., a time in which the data collection application is executed or wakes from suspension). The ordinate of graph data structure 200 represents predicted activities and their associated probability. The abscissa of graph data structure 200 represents time going backwards from a waking event, such as wake event 202. A waking event may be any predetermined event such as, but not limited to, the mobile device crossing, or otherwise going outside of, a geofence (or any particular boundary), a visit notification, a notification from a notification service (e.g., known as a "push notification"), a scheduled time, detecting sensor data indicative of movement, or the like. A visit may be a notification from the operating system of the mobile device indicating that the mobile device is located at a location for long enough that the operating system determines that the mobile device is "visiting" the location. The visit may correspond to any location at which the mobile device is positioned for longer than a threshold time interval. For example, a location may correspond to an establishment (e.g., a business, public institution, residence, or the like). In some embodiments, the activity detection engine receives activity data for each hour of the preceding twelve hour time interval and represents, in the graph data structure, the activity having the highest probability (if more than one activity was received). For instance, at minus twelve hours (e.g., twelve hours prior to execution of the data collection application) the activity 204 corresponds to stationary, at minus eleven hours the activity 208 corresponds to walking, at minus three hours the activity 212 corresponds to a medium probability of automotive activity, and at minus nine hours the activity 216 corresponds to a high probability of automotive activity.

The activity detection engine identifies a missed trip 203 using the activity data of the graph data structure 200. For instance, the activity detection engine identifies a first time 220, which is an earliest time in which an activity drive high is detected. The activity detection engine identifies activity 216 as the activity that corresponds to the first time 220. In some instances, the activity detection engine identifies the earliest time of any automotive activity (e.g., a medium or high probability of automotive activity). In the graph data structure 200, the first time 220 was detected at minus nine hours (e.g., nine hours prior to execution of the data collection application). The activity detection engine then identifies a second time 224, which is the earliest time after the first time in which a different activity is detected. For example, the activity detection engine identifies activity 228 as being the next activity that is not automotive activity. The different activity may be any activity other than an automotive activity, such as walking or stationary in the example described by graph data structure 200. In some instances, the activity detection engine identifies a second time that corresponds to an activity that is associated with anything other than a high probability of automotive activity (e.g., a medium probability of automotive activity, walking, cycling, or stationary). For instance, the second time may correspond to automotive activity, even if the probability of automotive activity occurring is medium, low, or zero. The activity detection engine then identifies a missed trip that occurred over a time interval that includes the time period between first time 220 and second time 224 (e.g., minus nine hours to minus six hours).

The activity detection engine may then identify if another missed trip occurred by identifying a third time, which is an earliest time after the second time in which a driving activity is detected and a fourth time, which is an earliest time after the third time in which an activity other than a drive was detected. The process may continue until all missed trips are identified. Although the process of identifying missed trips begins by analyzing from an earliest time (e.g., minus twelve hours) to a waking time, the process may operate by analyzing activity data from the waking time towards the earliest time.

The data collection application may receive the sensor data from the operating system over the discrete time intervals in which a missed trip occurred (e.g., from minus nine hours to minus six hours as depicted in graph data structure 200). This prevents the data collection application from having to analyze sensor data that corresponds to time intervals that do not correspond to a missed drive.

Figure 3:
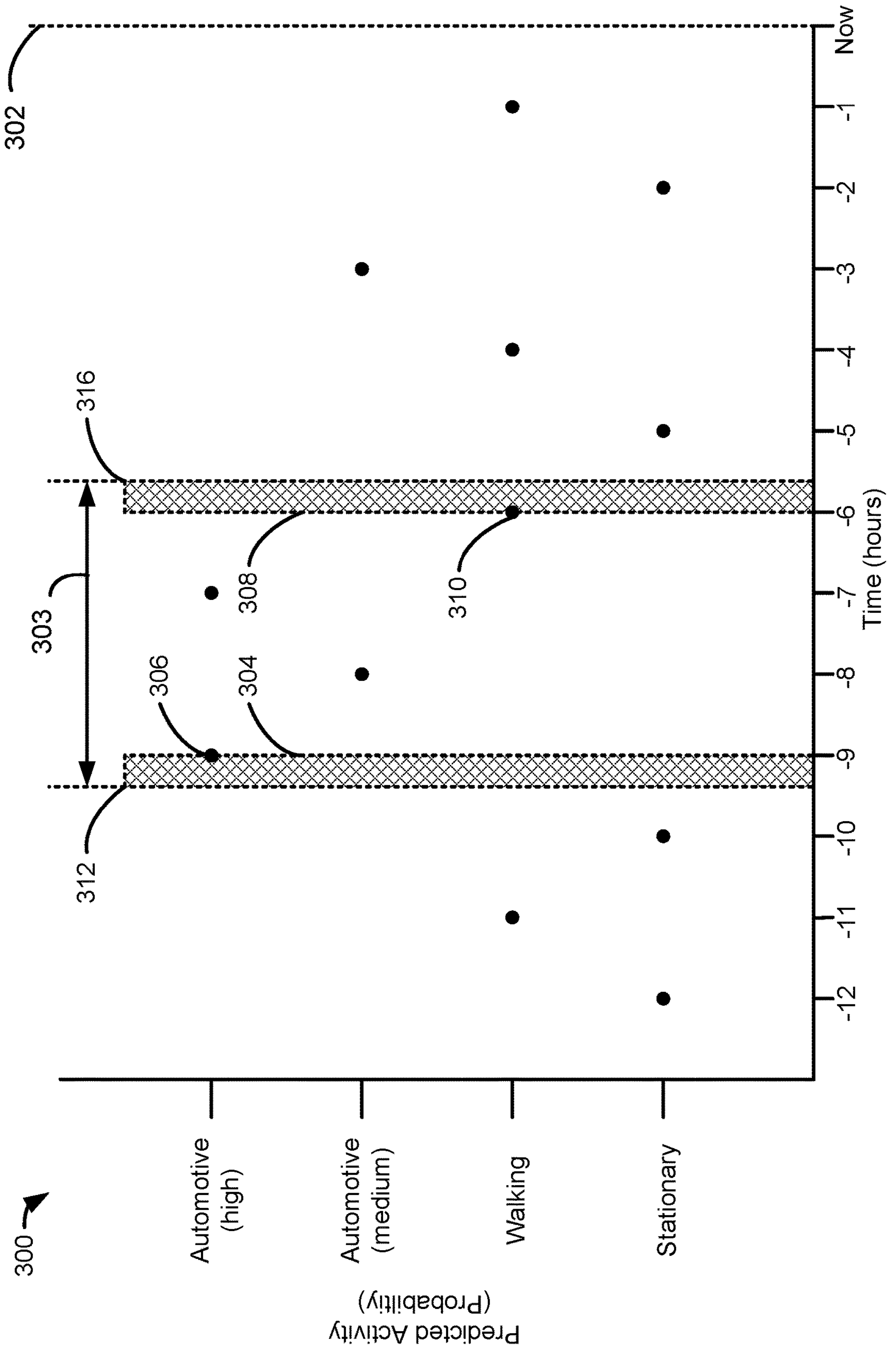
FIG. 3 is another exemplary representation of a graph data structure generated by an activity detection engine according to some embodiments.

FIG. 3 is another exemplary representation of a graph data structure 300 generated by an activity detection engine data according to some embodiments. The graph data structure 300 is an alternative example of the graph data structure 200 of FIG. 2 in which the missed drive time interval is altered to collect additional sensor data. In some instances, there may be a delay between the time when a drive begins and when the operating system detects driving high. The operating system receives sensor data and classifies the sensor data according an activity. The operating system may wait until a predetermined amount of sensor data is received to generate a probability of a particular activity. Alternatively, the operating system may not generate a probability of a particular activity until a given confidence threshold is exceeded. For example, if there is insufficient sensor data for the operating system to generate a probability with a given confidence, then the operating system may wait until more sensor data is received. The operating system may then generate a probability of a particular activity with a greater confidence.

If the activity detection engine identifies drives based on the activity detected by the operating system, then the delay between the beginning of a drive and a detection of a drive activity may cause the data collection application to miss sensor data associated with the drive. For instance, if a drive begins five minutes before the operating system detects a driving high activity, then the activity detection engine will miss the sensor data from the first five minutes of the drive.

The data collection application may correct for the delay by requesting sensor data over a larger time interval than the time interval during which the drive occurred. For instance, in the example of graph data structure 300, the activity detection engine indicates that a drive occurred over a first time interval 303 that includes a first time 304 (e.g., minus nine hours) based on activity 306 and a second time 308 (e.g., minus six hours) based on activity 310. The data collection application receives the sensor data from the operating system over a second time interval that begins at third time 312 prior to the first time and ends at a fourth time 316 after the second time. For example, the third time 312 may be ten minutes prior to the first time and the fourth time 316 may be ten minutes after the second time. The time interval between the first time 304 and third time 312 and the second time 308 and fourth time 316 may be the same or different. The time interval between the first time 304 and third time 312 and the second time 308 and fourth time 316 may be of any predetermined length (e.g., thirty seconds, ten minutes, thirty minutes, etc.), or dynamically determined based on previously detected or identified missed trips, available set of sensors, particular sensor values, or the like.

Figure 4:
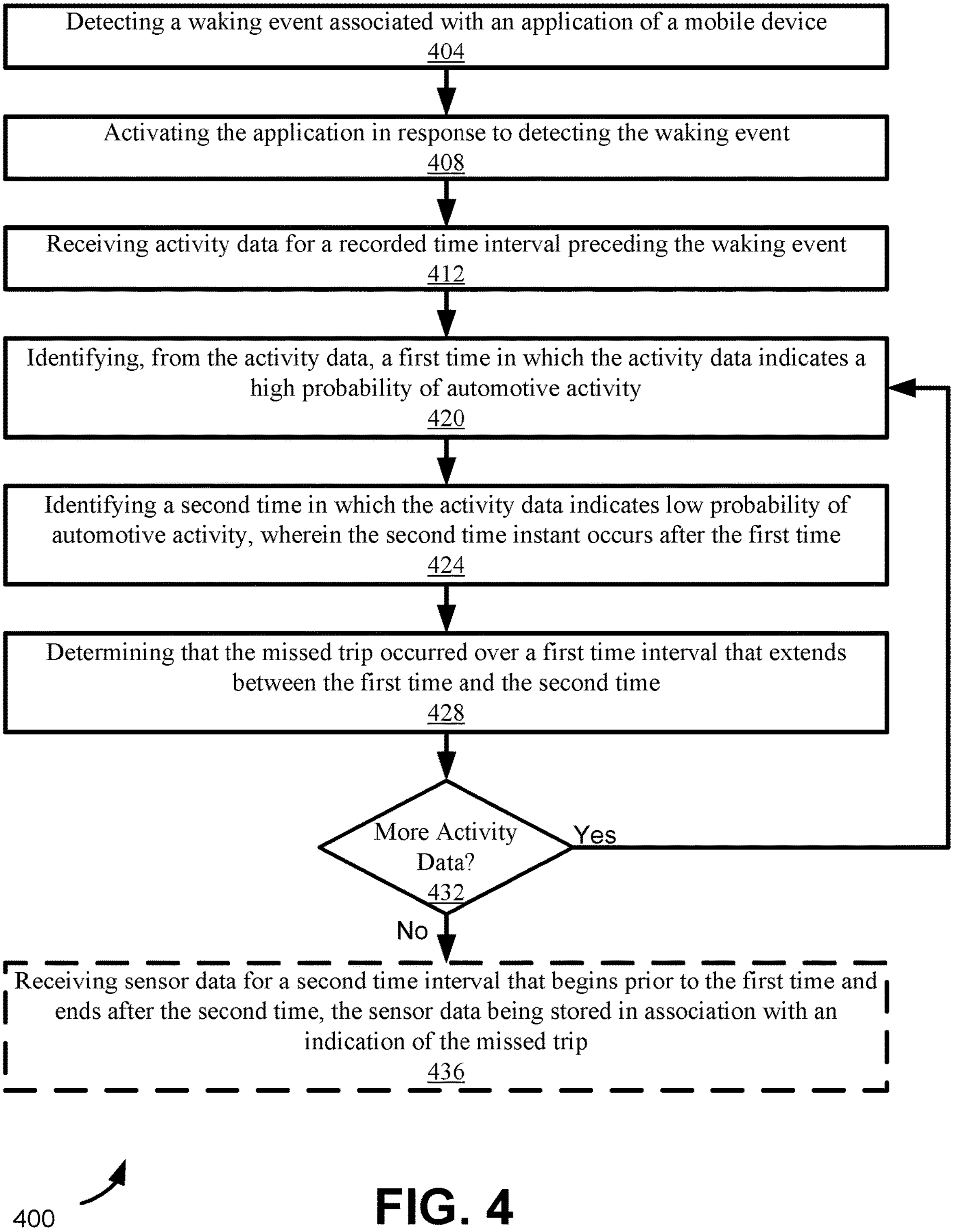
FIG. 4 is an exemplary process for detecting a missed drive from cached data according to some embodiments.

FIG. 4 is an exemplary process 400 for detecting a missed drive from cached data according to some embodiments. At block 404, a waking event associated with an application (e.g., such as a data collection application as previously described) of a mobile device is detected. The waking event is detected while the application is not executing (e.g., terminated or otherwise not loaded into memory) or is in a suspended state (e.g., process threads of the application are paused). In some instances, a background process of the application monitors events of the mobile device to detect the waking event. The background process may be the only portion of the application that may be executing. In other instances, the application registers with a monitoring application executing on the mobile device or the operating system of the mobile device to detect particular events when the application is not executing or is suspended.

The waking event may be any predetermined event detectable by the application, monitoring application, and/or operating system. For example, the application may generate a geo-fence that triggers the waking event when the geofence is crossed by the mobile device. A geo-fence may be a virtual perimeter of any size that surrounds the mobile device or any other point of interest. Other waking events can include, but are not limited to, detection that the mobile device is exceeding a speed threshold (e.g., a threshold that indicates the mobile device is positioned in a moving vehicle), expiration of a timer, a predetermined time, detection of a vibration exceeding a threshold, detection of a magnetometer value exceeding a threshold, receiving a notification, detecting proximity to a particular location or entity (e.g., a building, a residence, a particular location of a business such as a particular coffee shop, any location of the business such as any coffee shop owned by the business, a location of interest to a user associated with the mobile device, or the like), or the like.

At block 408, the background process (or the process that detected the waking event) triggers activation of the application in response to detecting the waking event. Activating the application can include executing the application or causing the application to return from a suspended state (e.g., threads of the application resume active execution). In some instances, the application may request passive collection of sensor data from the operating system for a recorded time interval. The operating system collects and caches sensor data using some or all of the sensors of the mobile device while applications are not executing. The operating system may collect and cache the sensor data for the recorded time interval after a request is made. This enables the application to obtain some sensor data while the application is not executing or is suspended. The next time the application executes or returns from suspension, the application may request the data collected over the recorded time interval. In some instances, the operating system may only collect data from a subset of available sensors. For example, the operating system may collect sensor data from sensors that are inaccessible to other data collection applications (e.g., reserved for the operating system and other system processes). In some instances, the operating system may limit the sampling rate of the sensor data collection. For example, the sampling rate of the sensor data collection may be fixed by the operating system. Alternatively, the sampling rate may be adjustable up to a limit defined by the operating system.

If the waking event corresponds to the beginning of a drive (e.g., the geo-fence was crossed, sensor data indicates the mobile device is positioned in a moving vehicle, user input, or the like), the application begins collecting sensor data, such as inertial measurement sensor data from sensor data block 108 of FIG. 1, for the current drive. In some instances, the waking event may not be detected until after the drive starts. For instance, there may be delay between when the drive begins and when sufficient sensor data can be collected to indicate that the waking event has occurred. In those instances, the application may request sensor data collected and cached by the operating system over a previous time interval that preceded the waking event. The previous time interval may be included in a recorded time interval that was previously requested by the application.

For instance, the application may request sensor data for a ten minute time interval that immediately preceded the waking event. The application may request any sensor data collected during a time interval that immediately precedes the waking event. In some instances, the time interval may be dynamically selected (e.g., at the time in which the waking event is detected) based at least in part on sensor data received at or immediately after the waking event. For instance, if the sensor data indicates the vehicle has been driving for a while (e.g., is already driving at high speed, is already a predetermined distance from a starting point or the geo-fence, or the like), then the application may increase the length of the time interval to ensure the entire drive is captured. The length of the time interval may be dynamically determined using current sensor data and/or previous active or missed trips. For instance, previous trips may be used to determine if the application should increase the length of the time interval. The previous trips may be previous trips captured or detected by the mobile device or by other mobile devices. The other mobile devices may be similar mobile devices (e.g., being of a same class of devices, having a same operating system, having similar hardware, etc.). The application may continue to capture sensor data until it is determined that the drive has terminated (e.g., the sensor data indicates that the mobile device is not moving in a vehicle for a duration that exceeds a threshold).

At block 412, the application receives activity data for a recorded time interval preceding the waking event. The activity data may include activity data that was detected during a time interval that was previously requested by the application. The activity data includes a probability (e.g., a confidence) of an activity associated with the mobile device (e.g., that a user of the mobile device is performing an activity). In some instances, the activity data may include multiple probabilities, one for each activity. In other instances, the activity data may include the activity with the highest probability. Examples of such activities include, but are not limited to, stationary, walking, running, a drive, cycling, flying, and the like. A drive can include multiple activities such as operating a vehicle, being a passenger in a vehicle, or the like.

In some instances, the activity data may be pushed to the application every time a currently predicted activity changes. For instance, the application may receive first activity data indicating a first activity. The application may then receive second activity data when a different activity compared to the first activity is detected. The time interval between receiving the first activity and the second activity corresponds to an amount of time of the first activity. For example, first activity data is received indicating an activity of walking. Thirty minutes later, activity data is received indicating an activity of stationary. The application may determine that the mobile device was located with a user who was walking for thirty minutes. In other instances, the activity data may be polled such that a probability of an activity may be determined at regular predetermined time intervals within the recorded time interval such as, but not limited to, every fifteen minutes, thirty minutes, hour, two hours, or the like. For instance, the application may transmit a request for activity every predetermined time interval.

At block 420, the application identifies a first time in which the activity data indicates a high probability of automotive activity. The first time may be the earliest time in which an activity of a drive occurs with a probability that exceeds a threshold (e.g., a high probability of automotive activity as compared to a medium or low probability of automotive activity). In some instances, the activity detection engine identifies the earliest time of any automotive activity (e.g., a medium or low probability of automotive activity). In some instances, the application may use the activity data to identify activities and their probabilities for determining the first time. In other instances, the application may use the activity data to identify an activity (without corresponding probability) for determining the first time.

At block 424, the application identifies a second time after the first time in which the activity data indicates a low probability of automotive activity. The second time may be the earliest time after the first time in which an activity other than a drive is indicated. For example, the second time may indicate a high probability of walking, or being stationary. In some instances, the second time may correspond to an activity that can include a drive, provided that the probability of driving does not exceed the threshold. In some instances, the application may use the activity data to identify activities and their probabilities for determining the second time. In those instances, the application may use the activities and their corresponding probabilities to determine that the drive (or any particular activity) is continuing. In other instances, the application may use the activity data to identify an activity (without corresponding probability) for determining the second time.

At block 428, the application determines that a missed drive has occurred over a first time interval that includes the first time and the second time. For example, an activity detection engine may determine, based at least in part on the activity data at the first time (e.g., driving activity) and the activity data at the second time (e.g., walking activity), that there was a missed drive during the period of time between the first time and the second time.

At block 432, the application determines if there is more activity data to analyze for missed trips over the recorded time interval. If there is more activity data to analyze, then the process may return to block 416 to determine if there is another missed drive provided that a threshold portion of the recorded time interval remains to be analyzed. For example, if the second time is less than the waking time, then it may be determined that there is more activity data to analyze for possible missed trips. In some instances, the process may simply continue to block 436 after determining that a first missed drive has occurred. The processes of block 416 through block 432 may repeat until all possible missed drives have been detected.

At block 436, the application optionally receives, in response to detecting the missed drive, sensor data collected and cached by the operating system (or another application) of the mobile device over a second time interval. The sensor data may be stored in association with an indication of the missed trip. The second time interval may be larger than the first time interval to account for delays in the detection of activities in the activity data. A delay between an activity occurring and the mobile device identifying that the activity is occurring may cause some sensor data associated with the activity to be lost. For instance, if a drive begins a few minutes prior to the mobile device indicating a high probability that a drive is occurring or that there is automotive activity, the application may not obtain all of the sensor data that corresponds to the drive (e.g., the first few minutes of the drive prior to the first time). The second time interval may include a third time that is prior to the first time and a fourth time that is equal to or later than the second time. In some instances, the third time may be ten minutes prior to the first time and the fourth time may be ten minutes after the second time. The application may dynamically determine the third time and the fourth time.

The sensor data over the second time interval may be used to analyze characteristics of the drive such as user behavior, vehicle collisions, drive events, user ratings such as driver ratings, or the like. The sensor data may be analyzed according to the processes described in any of the applications or patents incorporated herein by reference or for any purpose as described in any of the applications or patents incorporated herein by reference. The data may be analyzed by the mobile device or transmitted to a server for analysis.

For example, the sensor data may be analyzed to generate one or more speed predictions of the vehicle over the missed drive. One or more sensor signals (e.g., discrete sensor measurements) may be generated from the sensor data. Statistical features may be extracted from the sensor signals and passed as input into a machine-learning model. The machine-learning model may predict, using the statistical features, a speed of at a particular time during the missed trip.

The sensor data may also be used to determine a route of the vehicle over the missed trip. The application may determine a first location as corresponding to a location of the mobile device at the termination of a previous trip (e.g., the trip preceding the missed trip) and second location as the location of the mobile device at the waking event. The sensor data may be used to determine visit data for one or more visits during the missed trip. A visit may be a notification from the operating system indicating that the mobile device is located at a location (e.g., an establishment or the like) for longer than a threshold time interval. The visit data may be determined from GPS data that may be correlated with a map and/or user information. The application may then reconstruct a route of the vehicle during the missed trip that begins at the first location, extends along the one or more visits, and ends at the second location.

It should be appreciated that the specific steps illustrated in FIG. 4 provide a particular method for detecting a missed drive from cached data according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
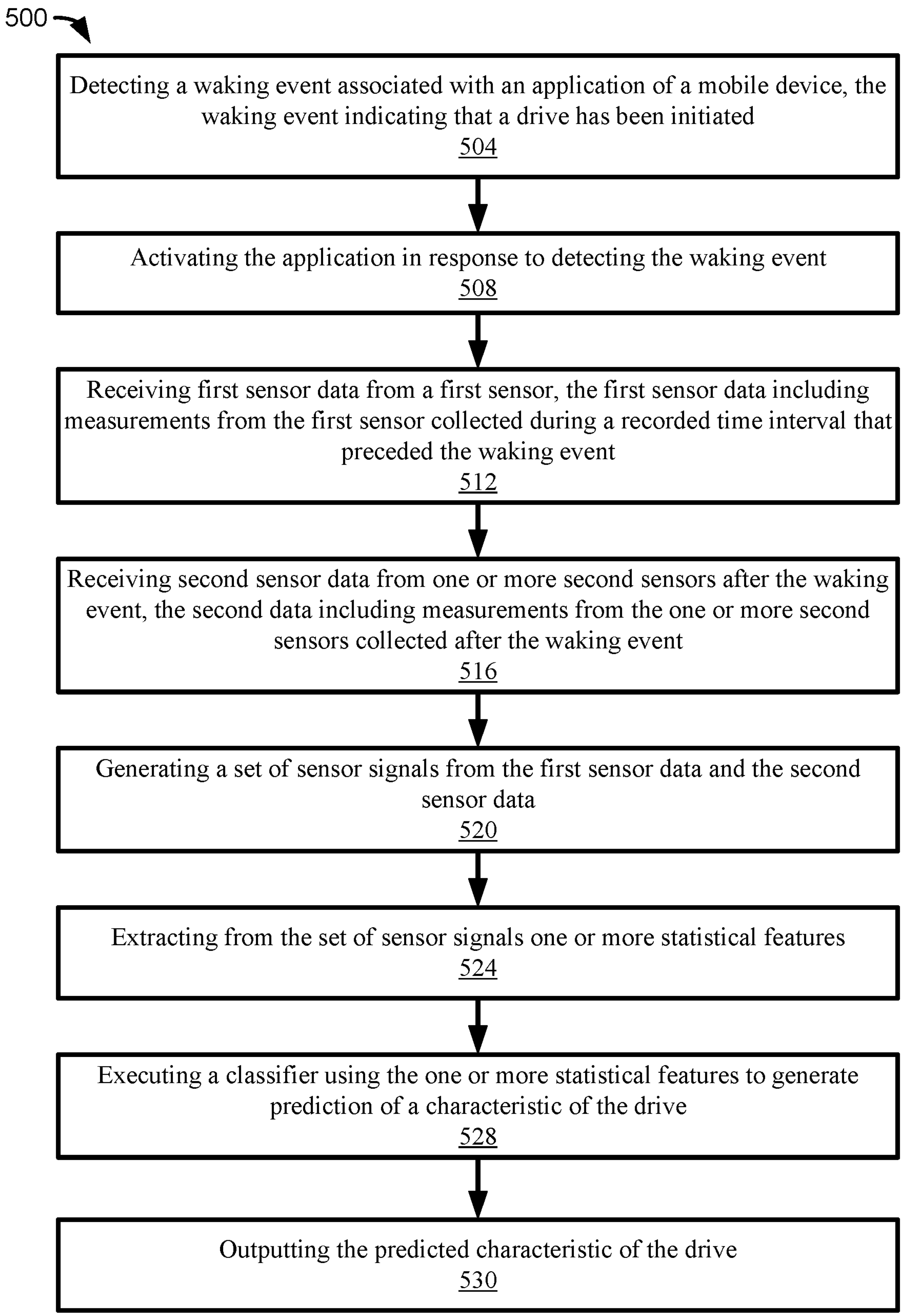
FIG. 5 is an exemplary process for detecting characteristics of a vehicle from cached data according to some embodiments.

FIG. 5 is an exemplary process 500 for predicting characteristics of a drive from cached data according to some embodiments. At block 504, a waking event associated with an application (e.g., such as a data collection application as previously described) of a mobile device is detected. The waking event is detected while the application is not executing (e.g., terminated or otherwise not loaded into memory) or is in a suspended state (e.g., process threads of the application are paused). In some instances, a background process of the application monitors events of the mobile device to detect the waking event. The background process may be the only portion of the application that may be executing. In other instances, the application registers with a monitoring application executing on the mobile device or the operating system of the mobile device to detect particular events when the application is not executing or is suspended.

The waking event may be any predetermined event detectable by the application, monitoring application, and/or operating system. For example, the application may generate a geo-fence that triggers the waking event when the geofence is crossed by the mobile device. A geo-fence may be a virtual perimeter of any size that surrounds the mobile device or any other point of interest. Other waking events can include, but are not limited to, detection that the mobile device is exceeding a speed threshold (e.g., a threshold that indicates the mobile device is positioned in a moving vehicle), expiration of a timer, a predetermined time, detection of a vibration exceeding a threshold, detection of a magnetometer value exceeding a threshold, receiving a notification, detecting proximity to a particular location or entity (e.g., a building, a residence, a particular location of a business such as a particular coffee shop, any location of the business such as any coffee shop owned by the business, a location of interest to a user associated with the mobile device, or the like), or the like. Some or all of these waking events may correspond to the initiation of a drive. For instance, the mobile device may be positioned within a vehicle. When the vehicle begins to move (e.g., as the drive begins), a monitoring application (e.g., such as an operating system of the mobile device or the like) detects the movement and triggers the waking event.

At block 508, a background process (or the process that detected the waking event) triggers activation of the application. Activating the application can include executing the application or causing the application to return from a suspended state (e.g., threads of the application resume active execution). In some instances, the application may request passive collection of sensor data from the operating system for a recorded time interval. The operating system collects and caches sensor data using some or all of the sensors of the mobile device while applications are not executing. The operating system may collect and cache the sensor data for the recorded time interval after a request is made. This enables the application to obtain some sensor data while the application is not executing or is suspended. The next time the application executes or returns from suspension, the application may request the data collected over the recorded time interval. In some instances, the operating system may only collect data from a subset of available sensors. For example, the operating system may collect sensor data from sensors that are inaccessible to other data collection applications (e.g., reserved for the operating system and other system processes). In some instances, the operating system may limit the sampling rate of the sensor data collection. For example, the sampling rate of the sensor data collection may be fixed by the operating system. Alternatively, the sampling rate may be adjustable up to a limit defined by the operating system.

If the waking event corresponds to the beginning of a drive (e.g., the geo-fence was crossed, sensor data indicates the mobile device is positioned in a moving vehicle, user input, or the like), the application begins collecting sensor data, such as IMU sensor data from sensor data block 108 of FIG. 1 for the current drive. In some instances, the waking event may not be detected until after the drive starts. For instance, there may be delay between when the drive begins and when sensor data can be collected to indicate that the waking event has occurred. In those instances, the application may request sensor data collected and cached by the operating system over a previous time interval that preceded the waking event. The previous time interval may be included in a recorded time interval that was previously requested by the application.

For instance, the application may request sensor data for a ten minute time interval that immediately preceded the waking event. The application may request any sensor data collected during a time interval that immediately precedes the waking event. In some instances, the time interval may be dynamically selected (e.g., at the time in which the waking event is detected) based at least in part on sensor data received at or immediately after the waking event. For instance, if the sensor data indicates the vehicle has been driving for a while (e.g., is already driving at high speed, is already a predetermined distance from a starting point or the geo-fence, or the like), then the application may increase the length of the time interval to ensure the entire drive is captured. The length of the time interval may be dynamically determined using current sensor data and/or previous active or missed trips. For instance, previous trips may be used to determine if the application should increase the length of the time interval. The previous trips may be previous trips captured or detected by the mobile device or by other mobile devices. The other mobile devices may be similar mobile devices (e.g., being of a same class of devices, having a same operating system, having similar hardware, etc.). The application may continue to capture sensor data until it is determined that the drive has terminated (e.g., the sensor data indicates that the mobile device is not moving in a vehicle for a duration that exceeds a threshold).

At block 512, the application receives first sensor data from a first sensor of the mobile device. The first sensor data may include measurements from the first sensor collected during a recorded time interval that preceded the waking event. The application may request sensor data from a passive data collection process such as another application of the mobile device or an operating system of the mobile device. For example, the passive data collection process may collect sensor data from the first sensor while the application is not executing or is suspended. In response to the waking event, the application may request the sensor data collected while the application was not executing. The first sensor may be a sensor that is inaccessible to the application, such as sensors reserved for system processes of the operating system. The first sensor may include any of the sensors of sensor data block 108 of FIG. 1. For example, the first sensor may include one or more of a GPS receiver, an accelerometer controlled by an operating system of a mobile device, a magnetometer, a gyroscope, a microphone, a compass, and/or a barometer. In some instances, the sampling rate of the first sensor may be limited to a predetermined sampling rate set by the data collection process. For example, the sampling rate of the sensor data collection may be fixed by the operating system. Alternatively, the sampling rate may be adjustable up to a limit defined by the operating system.

At block 516, the application receives sensor data from one or more second sensors of the mobile device after the waking event including sensor measurements from the one or more second sensors collected after the waking event. The one or more second sensors may include the first sensor if the first sensor is accessible to the application. The one or more second sensors may include any of the sensors of sensor data block 108 of FIG. 1. For example, the one or more second sensors may include any combination of a GPS receiver, an accelerometer controlled by an operating system, a magnetometer, a gyroscope, a microphone, a compass, and/or a barometer. The application may continue to collect measurements from the one or more second sensors until the sensors indicate that the drive has terminated.

At block 520, a set of sensor signals are generated from the first sensor data and the second sensor data. The first sensor data and the second sensor data may be processed by, for example, filtering the first sensor data and/or the second sensor data to remove outlier sensor data and noise. The remaining first sensor data and/or the second sensor data may be normalized (e.g., by averaging, weighting function, etc.). The normalized sensor data may then be converted to a frequency domain (e.g., through a Fourier transform, an infinite impulse response, or the like) to form the set of sensor signals.

At block 524, one or more statistical features may be extracted from the set of sensors or a subset of sensors. Statistical features may include, for example, median, variance, and maximum values from sensors such as an accelerometer controlled by an operating system, a gyroscope, and/or a magnetometer. The one or more statistical features may correspond to characteristics that can be observed from the set of sensor signals. For example, the one or more statistical features may correspond to characteristics of the drive. Characteristics of a drive may include detecting a vehicle collision, a speed of the vehicle, a location of the vehicle, an operating condition of the vehicle (e.g., whether the vehicle is safe to drive), hard acceleration or declaration (e.g., hard braking), driver behavior, distracted driving, or the like.

At block 528, the application executes a classifier using the one or more statistical features. The classifier may be a machine-learning model trained to generate a prediction of a characteristic of the drive. The classifier and/or machine-learning model may be trained using features extracted from training data of a large number of driving trips. The generated prediction of the characteristics of the drive may include, but are not limited to, detecting a vehicle collision, a speed of the vehicle, a location of the vehicle, an operating condition of the vehicle (e.g., whether the vehicle is safe to drive), hard acceleration or declaration (e.g., hard braking), driver behavior, distracted driving, or the like.

At block 530, the application may then output the predicted characteristic of the drive. In some instances, outputting the predicted characteristic may include transmitting the predicted characteristic to another computing device such as a server. In other instances, outputting the predicted characteristic includes generating a graphical user interface that includes a representation of the predicted characteristic. The graphical user interface may include a representation of a baseline value for the predicted characteristic and if there is a significant deviation between the predicted characteristic and the baseline value, the graphical user interface may provide an alert such as visual (and our audible) indication that the predicted characteristic exceeds a standard (e.g., such as a safety standard, road conditions, legal standards such as a speed limit, or the like).

The processes of block 516 through block 530 may occur in real time as the measurements from the one or more sensors are collected by the application. The application may use a sliding window that generates a set of sensor signals using the measurements from the one or more second sensors collected during the sliding window. The sliding window may be of any predetermined time interval (e.g., such as 15 seconds, thirty seconds, etc.). For example, for a sliding window of 15 seconds, at a discrete time zero (when the waking event is detected), the sliding window includes measurements collected from the one or more sensors from minus 15 seconds to discrete time zero. The next discrete time (e.g., such as the next second), the sliding window includes measurements collected from the one or more sensors from minus 14 seconds to time plus 1 second. The sliding window may be incremented according to any predetermined time value such as every second (as previously described), 5 seconds, 15 seconds, etc., thereby generating a new set of sensor signals (e.g., discrete sensor measurements) from the measurements over each subsequent sliding window (e.g., at regular intervals according to the predetermined time value) and a new predictions of the characteristic using each new set of sensor signals. This process may continue for a predetermined time interval, until a prediction exceeds a threshold, or until the drive terminates.

The sensor may also be used to determine a route of the vehicle during the drive. The application may determine a first location as corresponding to a location of the mobile device at the termination of a previous trip (e.g., the trip preceding the drive) and a second location as the location of the mobile device at the end of the drive. The sensor data may be used to determine visit data for one or more visits during the drive. A visit may be a notification from the operating system indicating that the mobile device is located at a location (e.g., an establishment or the like) for longer than a threshold time interval. The visit data may be determined from GPS data that may be correlated with a map and/or user information. The application may then reconstruct a route of the vehicle during the drive that begins at the first location, extends along the one or more visits, and ends at the second location.

It should be appreciated that the specific steps illustrated in FIG. 5 provide a particular method of predicting characteristics of a drive from cached data according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
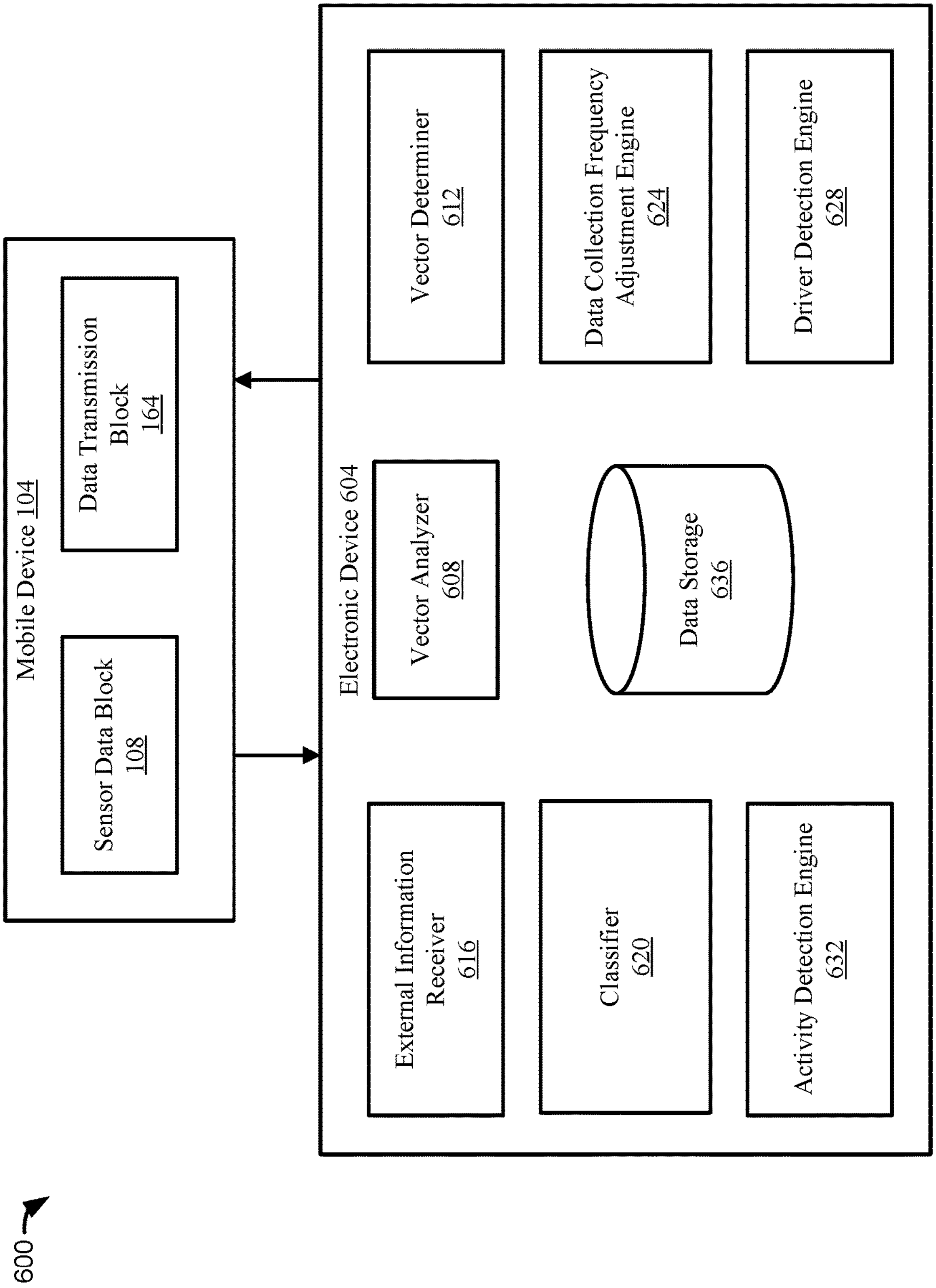
FIG. 6 depicts an exemplary block diagram of an electronic device for collecting driving data according to some embodiments.

FIG. 6 is a simplified block diagram illustrating an example of another system 600 for collecting driving data according to some aspects of the present invention. System 600 may include electronic device 604, which may be incorporated within mobile device 104 (e.g., as specialized hardware or software) or may be a separate device (or execute on a separate device) that communicates with the mobile device 104. For instance, as a separate device, electronic device 604 may be a mobile device (e.g., such as mobile device 104 of FIG. 1, a similar type of mobile device, a different type of mobile device, or the like), a server, a computing device such as a desktop or laptop computer, a specialized processing device (e.g., such as one or more application specific integrated circuits, field programmable gate arrays, or the like), a distributed processing system (e.g., such as a cloud environment or the like), a combination thereof (e.g., such as a distributed process), or the like. In some embodiments, the electronic device 604 may provide functionality using components including, but not limited to: a vector analyzer 608, a vector determiner 612, an external information receiver 616, and a classifier 620 (e.g., a machine learning model), a data collection frequency engine 624, a driver detection engine 628, and activity detection engine 632. Each component may include one or more processors (not shown) and memory (not shown). Instructions stored in the memory of a component may be executed by the one or more processors of the component to provide the functionality of the component. Alternatively, one or more processors of electronic device 604 (not shown) may execute instructions stored in a central memory of electronic device 604 to provide the functionality of the components. The instructions may configure the components to function as necessary. The electronic device 604 may also include a data storage 636. In some instances, one or more of the components operating on electronic device 604 may be stored in memory 152 or storage 156 of mobile device 104 and/or executed by processor 148 of mobile device 104.

One or more of sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle and during a drive. In that instance, the one or more sensors may be operated while the mobile device is positioned proximate to a driver during a time interval that corresponds to when the driver is operating the vehicle. As used herein, the terms a "drive" and a "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information etc.) can be retrieved and correlated with collected driving data.

In some embodiments, a display of a mobile device (such as mobile device 104) can show representations of driving data collected by the one or more sensors or generated by any of the components. For instance, representations of driving data can be generated by transforming collected sensor data (e.g., driving data collected using sensor data block 108) into different results, including, but not limited to, estimates of an activity of a user of mobile device 104 (e.g., stationary, walking, running, driving, etc.), estimates of the occurrence of different driving events during a drive for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments. Further disclosure regarding scoring can be found in U.S. patent application Ser. No. 15/615,579, entitled "SYSTEMS AND METHODS FOR SCORING DRIVING TRIPS", filed Jun. 6, 2017, herein incorporated by reference in its entirety.

Sensor data (e.g., collected using the sensor data block 108) may be used to analyze movement of the mobile device to detect the occurrence of driving events. The sensor data may be aggregated by electronic device 604 and analyzed once a predetermined amount of the sensor data is received. For example, once the electronic device 604 aggregates a 50 megabytes of sensor data, the electronic device 604 may initiate an analysis of the sensor data. In another example, the electronic device 604 may initiate an analysis of the sensor data once electronic device 604 receives sensor data collected over a predetermined interval (e.g., a half hour of sensor data, an hour of sensor data, etc.). In still yet another example, the electronic device 604 aggregates sensor data associated with a drive and analyzes the sensor data once all of the sensor data associated with the trip is received. Alternatively, mobile device 104 includes one or more of components of electronic device 604 and provides analysis of sensor data in real time (e.g., as the one or more sensors obtain measurements).

A GPS receiver may provide time stamped location and speed data that can be used by various applications executing on the mobile device. The time stamped data can be used to accurately determine vehicle location and speed. The GPS receiver may detect a crash and determine distance traveled by the vehicle. For instance, the GPS receiver may detect a crash by detecting sudden changes in speed or location. However, since mobile devices operate with limited resources due to power and processing constraints and due to the high power consumption of operating a GPS receiver, electronic device 604 may use the one or more other sensors of mobile device 104 to detect vehicle location and/or speed.

For instance, a mobile device positioned in a vehicle experiences mechanical vibrations related to the activity of the vehicle. These vibrations are measurable using a subset of the sensors in the sensor data block 108 of mobile device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 116 may be a three axis accelerometer operable to measure longitudinal and lateral acceleration as well as acceleration due to gravity. The accelerometer 116 may also be controlled by an operating system. The gyroscope 124 and the magnetometer 120 may also be three axis devices and may measure angular rotation and magnetic heading, respectively, in three dimensions. The IMU may combine the three-dimensional accelerometer data with the three-dimensional gyroscopic data to identify movement of the mobile device with six degrees of freedom (e.g., translation and rotation).

In some instances, data obtained from the IMU can be filtered and used as input to train a classifier such as classifier 620, to predict vehicle speed. An example of such a classifier includes, but is not limited to, an xgboost classifier. The classifier may be trained using features extracted from training data of a large number of driving trips. The extracted training features may include statistical features of the driving data, for example, median, variance, and maximum values of the IMU signals (e.g., accelerometer, gyroscope, and magnetometer signals). In some instances, the orientation of the mobile device with respect to gravity may be determined and input to the classifier for training. Other statistical features may be used without departing from the scope of the present invention.

During a drive with a mobile device positioned in a vehicle, the IMU of the mobile device may be used to obtain movement measurements from any of the accelerometer, the gyroscope, and the magnetometer, and the movement measurements to generate an input for a classifier to predict vehicle speed. In some instances, the acceleration measurements used in the generated prediction of vehicle speed may be user acceleration measurements. User acceleration measurements may be acceleration measurements for which the gravity component of acceleration has been removed. In some instances, the acceleration measurements used in the generated prediction of vehicle speed may be raw acceleration measurements. Raw acceleration measurements may be acceleration measurements that include the gravity component.

The movement measurement signals from the IMU sensors may be sampled at a specified sampling rate to obtain digital signals. In some instances, a 9 Hz fixed sampling rate may be used for the movement measurement signals. In other instances, a 30 Hz fixed sampling rate may be used for the movement measurement signals. Other sampling rates, for example, 50 Hz or another sampling rate may be used. Higher sampling rates can provide improved speed estimation at the cost of increased resource consumption (e.g., processing and/or power resources). Electronic device 604 and/or mobile device 104 may modulate IMU sensor sampling in real time to optimize the volume of data collected (e.g., for accuracy of data analysis) and the resource consumption.

For instance, when the sampling rate is adjustable, if the mobile device is connected to a reliable power source (e.g., such as the vehicle's power supply), the movement measurement signals may be sampled at a highest frequency (e.g., 50 Hz or a predetermined highest frequency). If the mobile device is not connected to a power source, the movement measurement signals may be sampled at a lower frequency (e.g., 30 Hz sampling or a predetermined medium frequency). If the power supply of the mobile device is below a threshold value (e.g., 25% of maximum), then the adjustable sampling rate of the movement measurement signals may be reduced to a lower frequency (e.g., 9 Hz or a predetermined low frequency) to conserve the remaining power of the mobile device. In some instances, the sampling rate of the movement measurement signals may be adjustable to improve the speed estimation. For instance, an accuracy metric may be used to indicate a likelihood that a given speed estimation is valid. If the accuracy metric does not exceed a threshold, the sampling rate of the movement measurement signals may be temporarily or permanently increased until the accuracy metric exceeds the threshold. The mobile device may modulate the sampling rate in real time based on the operating conditions (e.g., resource consumption) of the mobile device or the metric.

Filtered IMU signals, can distinguish driving, stopping, and user walking patterns. A bandpass filter (e.g., implemented in hardware or software), for example, an infinite impulse response (IIR) filter, may be used to filter the IMU signals to isolate frequencies indicative of various vehicle activities and to remove signal magnitude values exceeding a specified threshold. Portions of the signals having magnitude values exceeding the specified threshold may be excluded from further bandpass filtering. The digital bandpass filters can be designed to isolate the amount of vibration (i.e., frequencies) occurring within specific frequency ranges of interest. For example, the amount of vibrations may be separated into frequency ranges from 0.2 Hz to 1.1 Hz, from 1.1 Hz to 2.0 Hz, etc., depending on the sampling frequency, by bandpass filtering the signals.

Changes in lower frequency bands, for example up to approximately 1 Hz, may contain information about the vehicle stopping, while changes in high frequency bands may correspond to the vehicle driving at higher speeds. The sources of the vibrations detected by the IMU sensors are complex interactions between engine vibrations resulting from speed changes (vibrations due to the vehicle interacting with the road surface at different speeds, etc.). A machine-learning model (e.g., the classifier) can learn these more complex interactions, which can be a combination of high and low frequencies, which correspond to each vehicle behavior.

In some instances, IMU sensor signals having large magnitudes may be disruptive to the vehicle speed prediction. In those instances, filtering may exclude the large magnitude signals. For example, accelerometer signal magnitude values exceeding a threshold value of about 10 $m/s^2$ or another threshold value, as well as any subsequent portions of the signal, may be excluded. The portions of the IMU signals up to, but not including, the signal magnitude values exceeding the threshold value may be bandpass filtered using the IIR filter.

The IIR filtering process may employ forward-backward filtering in which the portions of the IMU signals are filtered normally (i.e., forward filtering), and the forward filtered signals are "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, such that the result of the last step of the filter algorithm is applied to the next step. IIR filtering methods may be more computationally efficient than filtering methods that require computation of all intermediate numerical quantities that lead to the result (e.g., Fourier transforms). IIR filters are also advantageous because they can isolate frequency ranges of interest with greater signal amplitude attenuation outside of a range of interest. In some implementations, a finite impulse response (FIR) filter, rather than an IIR filter, may be used for bandpass filtering of the IMU signals.

The number of frequency bands used for the bandpass filtering may be determined by the desired granularity and the sampling frequency of the sensor data. For example, 14 passbands may be used in equally spaced 0.3 Hz frequency bands from 0.2 Hz to a Nyquist sampling frequency of 4.5 Hz for data obtained using a 9 Hz sampling, and 28 passbands may be used from 0.2 Hz to 15 Hz for data obtained using a 30 Hz data. More granular frequency bands may be used when the IMU signals are sampled at higher sampling frequencies. Selection of the number and width of the frequency bands may be determined based on the desired signal quality in each band and the granularity of the information. For example, too many frequency bands can result in degraded signal quality due to the narrow bandwidth, while too few frequency bands may result in loss of granularity of the captured information.

Features, for example statistical features, may be extracted from all of the filtered signals or just a subset of the filtered signals. The features used as inputs to classifier 620 can be summary statistics (e.g., median, variance, and maximum) over the various signals, covering different time spans. The features may be extracted from time windows of different lengths. In some implementations, each of the statistical features may be extracted from the IMU signals over a 5 second time window, a 10 second time window, and a 20 second time window. Each window may be centered at the time point under consideration. Over each of the windows, summary statistics such as the mean, median, variance, maximum, and minimum of the various band-passed versions of the IMU sensor signals (e.g., accelerometer, gyroscope, etc.) contained in these windows can be calculated.

The different length windows may provide levels of stability for the feature values, with longer window times producing more stable feature values. Other window lengths or a different number of windows may be used without departing from the scope of the invention. For example, in some implementations, a single window may be used. For a bandpass filtered accelerometer signal between 0.2 Hz to 1.1 Hz, nine features may be extracted, e.g., median, variance, and maximum, with each feature extracted over a 5 second time window, a 10 second time window, and a 20 second time window. The feature extraction produces a single list of values (e.g., a feature vector) for each time point under consideration.

The extracted features (e.g., the feature vectors) may be input to the classifier. The machine learning model (e.g., the classifier) can then make a speed prediction based on the feature vector inputs. The generated prediction of the vehicle speed by the classifier may be quantized, for example, in increments of 5 m/s or another increment. In some implementations, the orientation of the mobile device with respect to gravity may be determined and input to the classifier.

Activity detection engine 632 detects an activity that corresponds to sensor measurements received from the one or more sensors of sensor data block 108. For instance, the activity detection engine 632 detects when mobile device 104 is stationary, with a user who is walking, with a user who is running, in a vehicle that is driving, in a vehicle that is flying, and the like. In some instances, activity detection engine 632 outputs a probability of the activity. In those instances, activity detection engine 632 may output more than one probability such as a 45% probability that the mobile device is walking and a 33% probability that mobile device is driving, and 22% probability of some other activity. The probability may be expressed as an integer or real number, a percentage, a grade (such as a low, medium, or high), or in another mechanism configured to represent the probability of a given activity.

Activity detection engine 632 may use the activity to detect drives from sensor data. For instance, activity detection engine 632 may analyze the data received from mobile device 104 and identify a first time when the activity indicates a high probability of automotive activity, such as when the mobile device 104 is in a car that is driving. Activity detection engine 632 may identify a second time after the first time in which there is a high probability of another activity (e.g., stationary, walking, etc.). Activity detection engine 632 then defines a drive as occurring from the first time to the second time. Other components of electronic device 604 may then further analyze the sensor data received during that time interval to identify driver behavior, driver score, vehicle collision, etc. In some instances, this may be performed by an operating system of the mobile device to control data collection by sensor data block 108.

In some instances, activity detection engine 632 may operate on mobile device 104 to control collection of measurements from sensor data block 108. Mobile device 104 may execute a data collection application that controls the operation of the one or more sensors of mobile device 104 (e.g., such as sampling rates and the like) and collects measurements from the one or more sensors. The data collection application can include one or more components of electronic device 604. Since the mobile device operates with limited resources, the data collection application may be suspended or terminated while the mobile device is at rest or not during a drive. Activity detection engine 632 may operate in a background process to detect if a drive is occurring. If a drive or other automotive activity is occurring, activity detection engine 632 may cause the data collection application to be initiated and begin collection of sensor data associated with the drive. In some instances, activity detection engine 632 may generate a geofence around mobile device 104. If mobile device 104 crosses, or otherwise goes outside of, the geofence, then activity detection engine 632 may cause the data collection application to be initiated. For instance, the geofence may surround a user's house such that when the geofence is crossed, or a mobile device is detected outside the geofence, it is likely due to the user initiating a drive. The geofence may be generated after a period of inactivity. The geofence may be generated a predetermined distance from the mobile device such that when the mobile device crosses, or goes outside, the geofence, it is likely due to the beginning of a drive rather than through other activity such as walking. Other detectable events may be used to initiate the data collection application such as, but not limited to, visit data comprising a visit, other notification, time interval, one or more sensor measurements exceeding threshold, or the like.

Since a data collection application of the mobile device 104 may not collect sensor measurements until the geofence is crossed or the mobile device 104 is outside the geofence, some sensor measurements associated with a drive may be missed. As a result, the data collection application may not collect sensor measurements for the entire drive, thereby missing valuable information about the drive, driver behavior, potential vehicle collisions, etc. In some instances, the mobile device 104 may not detect that a geofence has been crossed, thereby never activating the one or more processes to collect sensor measurements. In those instances, the mobile device 104 may miss the entire drive. However, sensor measurements associated with the missed drive may still be acquired from other processes executing on mobile device 104.

For instance, an operating system of mobile device 104 may collect and cache some sensor measurements over a sliding window, such as an immediately preceding time interval of a predetermined length. The sliding window may include the preceding, twenty-four hours, forty-eight hours, seventy-two hours, ninety-six hours, or any predetermined time interval. Applications of mobile device 104 may request and obtain sensor measurements for up to the length of the sliding window.

The operating system may begin collecting and caching sensor measurements upon request by an application such as the data collection application and retain the cached sensor measurements for up to the length of the sliding window. At that point, the operating system discards the oldest sensor measurement each time a new sensor measurement is added. For instance, the operating system may cache up to the previous seventy-two hours of sensor measurements (e.g., seventy-two hours from a current time such as now), at which point, the oldest sensor measurements (e.g., anything older than seventy-two hours) may be discarded such that the cache retains those sensor measurements collected over immediately previous seventy-two hours. In some instances, the operating system may only allow an application to request collection and caching of sensor measurements for a particular time interval (e.g., that may be smaller than or equal to the length of the sliding window). The data collection application may not be able to request the operating system to cache sensor measurements over the entire sliding window if the particular time interval is less than the sliding window. Instead, the data collection application may generate a series of requests with each subsequent request being sent upon termination of the particular interval of the previous request. This enables the data collection application to request caching of sensor measurements by the operating system for the entire sliding window.

In the following example, a sliding window that is seventy-two hours in length is used and a predetermined time interval of twelve hours is used. It should be noted that embodiments of the present invention are not limited to these specific exemplary values. When the data collection application executes (or returns from suspension), the data collection application may generate a first request that the operating system collect and cache sensor measurements for a predetermined time interview, for example, the next twelve hours. In response, the operating system will begin collecting and caching sensor measurements.

Figure 7:
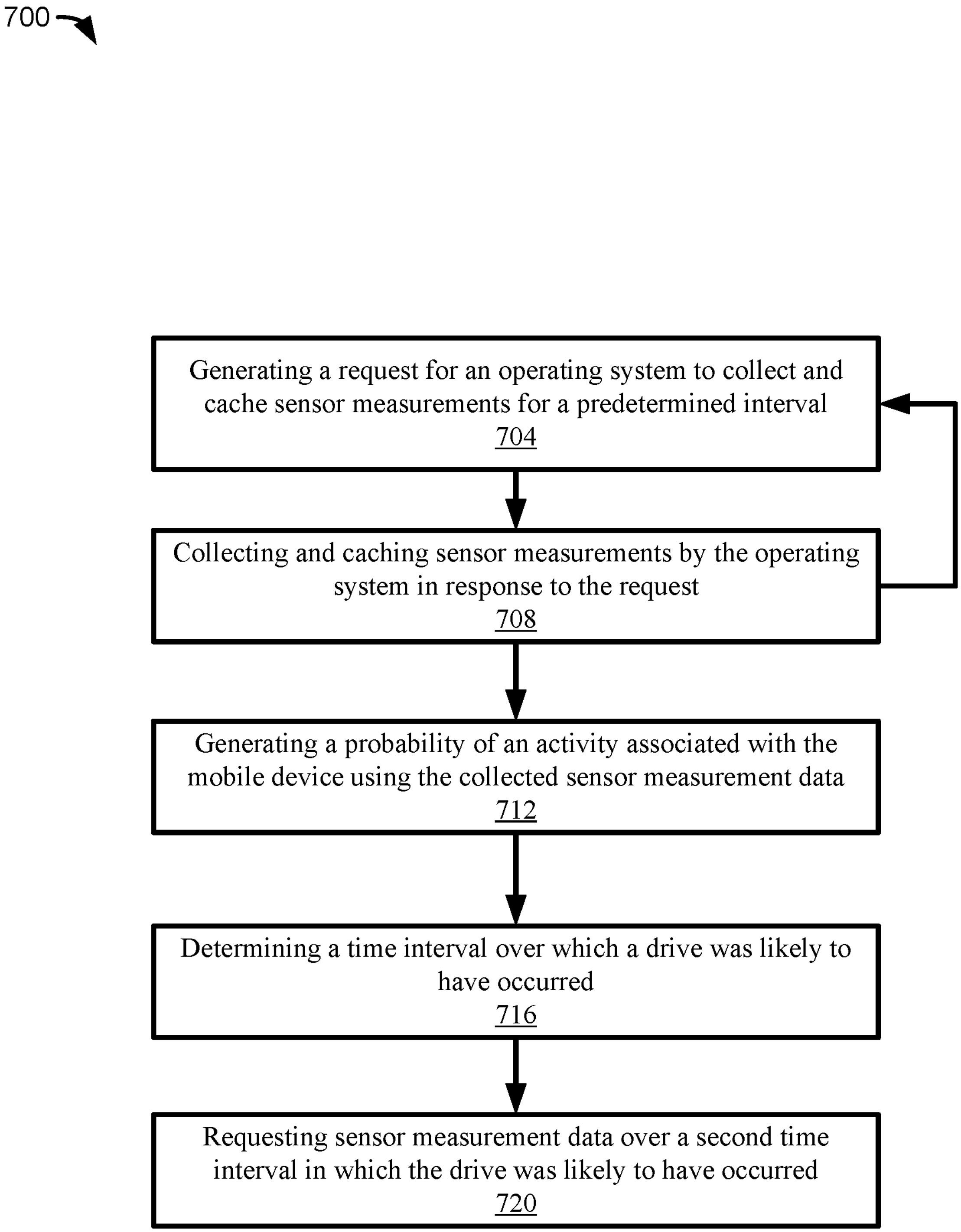
FIG. 7 is an exemplary process for collecting and caching sensor measurements used in detecting a missed drive according to some embodiments.

FIG. 7 is an exemplary process 700 for collecting and caching sensor measurements used in detecting a missed drive according to some embodiments. At block 704, a request is generated by an application for an operating system to collect and cache sensor measurements for a predetermined time interval. The request may be generated by a data collection application of a mobile device and sent to the operating system of the mobile device. The data collection application may generate the request in response to a waking event, such as the expiration of a timer or at a predetermined time. Prior to generating the request, and/or before the waking event, the data collection application may be in a suspended state. When the data collection application executes again (e.g., returns from suspension), the data collection application may generate the request to the operating system to collect and cache sensor measurements over the predetermined time interval. The predetermined time interval may be any amount of time in the future. For example, the predetermined time interval may extend 3 hours, 6 hours, 12, hours, 72 hours, or another period into the future. The predetermined time interval may be limited by the operating system. For example, the operating system may limit requests to collect and cache sensor measurement data for up to the next 12 hours, 6 hours, 3 hours, or fewer hours. After generating the request, the data collection application may then perform any intended operations that were the reason for its execution (or return from suspension) or terminate (or return to a suspended state).

At block 708, the operating system collects and caches sensor measurements in response to the request. The operating system of the mobile device may collect and cache sensor measurements from some or all of the sensors of the mobile device. For example, the operating system may collect sensor data from one or more of the sensors of sensor data block 108, such as global positioning system (GPS) receiver 112, accelerometer 116, magnetometer 120, gyroscope 124, microphone 128, external (sensor) device 132, compass 136, and/or barometer 140. In some instances, the operating system may only collect data from a subset of available sensors. For example, the operating system may collect sensor data from sensors that are inaccessible to other data collection applications (e.g., reserved for the operating system and other system processes). In some instances, the operating system may limit the sampling rate of the sensor data collection. For example, the sampling rate of the sensor data collection may be fixed by the operating system. Alternatively, the sampling rate may be adjustable up to a limit defined by the operating system.

In some embodiments, process 700 proceeds by repeating block 704 and block 708. Block 704 and block 708 may be repeated any number of times and may be performed in parallel with the remainder of process 700. For example, at the termination of the predetermined time interval, the data collection application may execute (or return from suspension) and generate a subsequent request to the operating system for collection and caching of sensor data for a subsequent predetermined time interval. The subsequent predetermined time interval may be the same length as the first predetermined time interval or it may be shorter or longer as necessary. In some instances, the data collection application may be executed before the termination of the predetermined time interval. In that instance, the application may generate the subsequent request to the operating system for collection and caching of sensor measurement data for a predetermined time interval that begins at the time of the second request (rather than at the termination of the previous predetermined time interval).

This process may be repeated such that the operating system caches up to a maximum amount of cached sensor measurement data. In some instances, the maximum amount of cached sensor measurement data is determined by the operating system. For example, the operating system may limit the amount of cached data due to memory constraints. As another example, the application may limit the amount of cached sensor measurement data to a sliding window, such as an immediately preceding time interval of a predetermined length. The sliding window may include the preceding twenty-four hours, forty-eight hours, seventy-two hours, ninety-six hours, or any predetermined time interval.

The data collection application may continue to make requests for collection and caching of sensor measurements even when the cache includes sensor measurements over the complete sliding window. In this case, the oldest sensor measurements (e.g., sensor measurements older than the beginning of the sliding window to the present time) may be discarded as new sensor measurements are stored in the cache. Sensor measurements may be continually discarded as new sensor measurements are continually cached over the next requested time interval. With back-to-back requests by the data collection application, the data collection application may cause the operating system to perpetually cache the preceding sensor measurement data for the predetermined time interval of the sliding window.

In some instances, applications of mobile device 104, including components of electronic device 604, may request data collection by the operating system while applications of the mobile device are suspended or not executing. The operating system may collect sensor measurements over a predetermined time interval. For instance, an application may request sensor measurements from the operating system for up to twelve hours after the application is suspended or terminated. When the application is executed again, the application may request access to the sensor measurements collected by the operating system while the application was suspended or terminated.

The data collection application may access the cached sensor measurements over the entire sliding window (e.g., seventy-two hours) based on the combination of requests, even though the data collection application may be limited to sending requests for data collection and caching over smaller time intervals (e.g., twelve hours). If the data collection application sends a first request (at the zero hour mark) for twelve hours of sensor measurements, when the data collection application executes (or returns from suspension) twelve hours later, the operating system will have collected and cached twelve hours of sensor measurements that the data collection application may access). When the data collection application sends a second request to the operating system (at the twelve hour mark) for another twelve hours of sensor measurement caching, the operating system continues to collect and cache sensor measurements for the next twelve hours. When the data collection application executes twelve hours later (e.g., now at the twenty-four hour mark), the data collection application may now access twenty-four hours of sensor data even though the data collection application may only request that the operating system collect and cache sensor measurements for the next twelve hours.

At block 712, an application generates a probability of an activity associated with the mobile device using the collected sensor measurement data. For instance, an activity detection engine, such as activity detection engine 632 as described above in relation to FIG. 6, detects when the mobile device is stationary, with a user who is walking, with a user who is running, in a vehicle that is driving, in a vehicle that is flying, and the like. In some instances, the activity detection engine outputs a probability of the activity. In those instances, the activity detection engine may output more than one probability such as a 45% probability that the mobile device is walking and a 33% probability that the mobile device is driving, and 22% probability of some other activity. The probability may be expressed as an integer or real number, a percentage, a grade (such as a low, medium, or high), or in another mechanism configured to represent the probability of a given activity. In some instances, this may be performed by the operating system itself. For instance, the operating system may output a probability that the mobile device is stationary, walking, running, driving, flying, or the like.

At block 716, the activity data is used to determine a time interval over which a drive was likely to have occurred. For instance, an activity detection engine, such as activity detection engine 632 as described above in relation to FIG. 6, may analyze the activity data and identify a first time when the activity indicates a high probability of automotive activity, such as when the mobile device is in a car that is driving. The activity detection engine may then identify a second time after the first time in which there is a high probability of another activity occurring (e.g., stationary, walking, etc.). The activity detection engine may then define a drive as occurring from the first time to the second time. This time interval may coincide with when a data collection application was suspended or terminated.

In some embodiments, the sensor data collected by the operating system may be added to any sensor data collected by the data collection application. For example, activity detection engine 632 can detect that mobile device 104 crossed a geofence and initiates execution of a data collection application to begin collection of sensor measurements such as IMU sensors. The data collection application can then request sensor data from the operating system for a time interval prior to when the mobile device crossed the geofence. This enables the mobile device 104 to capture sensor measurements over the entire duration of the drive despite the application executing and beginning collecting sensor measurements a few minutes into the drive.

At block 720, sensor data over a second time interval in which the drive was likely to have occurred is requested by an application. The second time interval may be larger than the first time interval to account for delays in the detection of activities in the activity data. In some instances, there may be a delay between when the drive begins and when the operating system or another application detects that a drive activity is occurring or occurred. Similarly, there may be delay between when the drive ends and the operating system or other application detects that the drive ended. To ensure that sensor data for the entire trip is collected, a data collection application may request the sensor data over a second (larger) time interval that begins prior to the first time interval (e.g., one minute, five minutes, ten minutes, or the like before the first time interval begins) and ends after the first time interval (e.g., one minute, five minutes, ten minutes, or the like after the first time interval ends).

It should be appreciated that the specific steps illustrated in FIG. 7 provide a particular method of collecting and caching sensor measurements used in detecting a missed drive according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate arrays (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. The program code or code segments may further configure a system to perform the necessary tasks. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices and/or other machine readable mediums for storing information. The term "computer-readable medium" includes, but is not limited to, portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:

activating an application stored on a mobile device based at least in part on first activity data;

upon activation of the application stored on the mobile device:

requesting, by the mobile device, an amount of second activity data generated by at least one sensor of the mobile device and including one or more sets of data corresponding to at least a first time interval preceding the activation of the application and a second time interval, wherein the amount of second activity data requested is based at least in part on the first activity data;

receiving the amount of second activity data; and detecting, using the second activity data, a trip by:

identifying, from the second activity data, the first time interval during which the second activity data indicates a non-binary numerical probability of vehicular activity is above a first predefined threshold;

identifying, from the second activity data, the second time interval during which the second activity data indicates a non-binary numerical probability of vehicular inactivity is above a second predefined threshold, wherein the second time interval occurs after the first time interval;

determining that the trip occurred during the first time interval and before the second time interval; and causing an indication that the trip occurred to be presented.

2. The method of claim 1, wherein the activation of the application is in response to a determination that the mobile device is positioned outside of a first geofence, a first notification received from an operating system of the mobile device, a second notification received by the mobile device from a server, a significant change in a location of the mobile device, a user launch, a scheduled time, or detecting sensor data indicative of a movement.

3. The method of claim 1, further comprising:

generating, by the application, at least one threshold including at least one of: a geo-fence, a speed threshold, a time threshold, vibration threshold, a magnetometer value threshold, or a proximity threshold;

comparing the first activity data to the at least one threshold;

determining the first activity data exceeds the at least one threshold; and responsive to determining the first activity data exceeds the at least one threshold, activating the application.

4. The method of claim 3, further comprising:

generating the at least one threshold based at least in part on the indication that the trip occurred.

5. The method of claim 1, wherein the one or more sets of data comprise:

one or more sets of sensor data collected by one or more sensors of the mobile device; and a set of activity data indicating, for each time interval of a plurality of time intervals within the one or more time intervals preceding the activation of the application, an activity of the mobile device.

6. The method of claim 1, further comprising:

executing, by the application, a second request to an operating system of the mobile device to cache sensor measurements for a predetermined time interval, wherein the predetermined time interval starts after the activation of the application.

7. The method of claim 1, wherein the one or more sets of data comprises a set of activity data and the method further comprises:

receiving one or more sets of sensor data for a third time interval that begins prior to a beginning of the first time interval and ends after an end of the first time interval, the one or more sets of sensor data being stored in association with an indication of the trip, and wherein an interval between a beginning of the third time interval and the beginning of the first time interval may be dynamically determined based on one or more previous trips or previously collected sensor data.

8. The method of claim 1, wherein the one or more sets of data comprises one or more sets of sensor data, the method further comprising:

generating, from the one or more sets of sensor data, a set of sensor signals;

extracting from the set of sensor signals one or more statistical features; and executing a classifier using the one or more statistical features to generate a prediction of a vehicle speed during the trip.

9. The method of claim 1, further comprising:

determining a first location of the mobile device upon termination of a previous trip and a second location of the mobile device upon activating the application;

determining, from the one or more sets of data, visit data that includes one or more visits occurring during the first time interval; and determining a route of the mobile device over the trip using the visit data, the first location, and the second location.

10. The method of claim 1, further comprising analyzing the second activity data to determine motion characteristics of the mobile device, wherein the motion characteristics of the mobile device include at least one of a vehicle collision, a speed, a location, a hard acceleration, a hard deceleration, or an indication of distracted driving.

11. The method of claim 10, further comprising transmitting the motion characteristics to use for generating a score.

12. A system comprising:

one or more processors; and a non-transitory computer-readable medium storing instructions which, when executed by the one or more processors, configure the system to:

activate an application running on a mobile device based at least in part on first activity data;

upon activation of the application stored on the mobile device:

request, by the mobile device, an amount of second activity data generated by at least one sensor of the mobile device and including one or more sets of data corresponding to at least a first time interval preceding the activation of the application and a second time interval, wherein the amount of second activity data requested is based at least in part on the first activity data; and detect, using the second activity data, a trip by:

identifying, from the second activity data, the first time interval during which the second activity data indicates a non-binary numerical probability of vehicular activity is above a first predefined threshold;

identifying, from the second activity data, the second time interval during which the second activity data indicates a non-binary numerical probability of vehicular inactivity is above a second predefined threshold, wherein the second time interval occurs after the first time interval; and determining that the trip occurred during the first time interval and before the second time interval; and cause an indication that the trip occurred to be presented.

13. The system of claim 12, wherein:

the activation of the application is in response to a determination that the mobile device is positioned outside of a first geofence, a first notification received from an operating system of the mobile device, a second notification received by the mobile device from a server, a significant change in a location of the mobile device, a scheduled time, detecting sensor data indicative of a movement, or a user launch; and the instructions further configure the system to:

receive, by the application, first sensor data from a first sensor, the first sensor data including measurements from the first sensor collected during a recorded time interval that preceded the activation of the application;

receive, by the application, second sensor data from one or more second sensors after the activation of the application, the second sensor data including measurements from the one or more second sensors collected after the activation of the application;

generate a set of sensor signals from the first sensor data and the second sensor data;

extract from the set of sensor signals one or more statistical features; and execute a classifier using the one or more statistical features to generate a prediction of a motion characteristic of the mobile device.

14. The system of claim 13, wherein the application limits resource consumption of the mobile device.

15. The system of claim 12, wherein the one or more sets of data comprises:

one or more sets of sensor data collected by one or more sensors of the mobile device; and a set of activity data indicating, for each time interval of a plurality of time intervals within the one or more time intervals preceding the activation of the application, an activity of the mobile device.

16. The system of claim 12, wherein the instructions further configure the system to:

determine a first location of the mobile device upon termination of a previous trip and a second location of the mobile device upon activating the application;

determine, from the one or more sets of data, visit data that includes one or more visits occurring during the first time interval; and determine a route of the mobile device over the trip using the visit data, the first location, and the second location.

17. One or more non-transitory computer-readable storage media storing instructions that, upon execution by one or more processors of a system, cause the system to perform operations comprising:

activating an application stored on a mobile device based at least in part on first activity data;

upon activation of the application stored on the mobile device:

requesting, by the mobile device, an amount of second activity data generated by at least one sensor of the mobile device and including one or more sets of data corresponding to at least a first time interval preceding the activation of the application and a second time interval, wherein the amount of second activity data requested is based at least in part on the first activity data;

receiving the amount of second activity data; and detecting, using the second activity data, a trip by:

identifying, from the second activity data, the first time interval during which the second activity data indicates a non-binary numerical probability of vehicular activity is above a first predefined threshold;

identifying, from the second activity data, the second time interval during which the second activity data indicates a non-binary numerical probability of vehicular inactivity is above a second predefined threshold, wherein the second time interval occurs after the first time interval;

determining that the trip occurred during the first time interval and before the second time interval; and causing an indication that the trip occurred to be presented.

18. The non-transitory computer-readable storage media of claim 17, wherein the activation of the application is in response to a determination that the mobile device is positioned outside of a first geofence, a first notification received from an operating system of the mobile device, a second notification received by the mobile device from a server, a significant change in a location of the mobile device, a user launch, a scheduled time, or detecting sensor data indicative of a movement.

19. The non-transitory computer-readable storage media of claim 17, wherein the instructions further cause the system to perform operations comprising:

generating, by the application, at least one threshold including at least one of: a geo-fence, a speed threshold, a time threshold, vibration threshold, a magnetometer value threshold, or a proximity threshold;

comparing the first activity data to the at least one threshold;

determining the first activity data exceeds the at least one threshold; and responsive to determining the first activity data exceeds the at least one threshold, activating the application.

20. The non-transitory computer-readable storage media of claim 17, wherein the one or more sets of data comprise:

one or more sets of sensor data collected by one or more sensors of the mobile device; and a set of activity data indicating, for each time interval of a plurality of time intervals within the one or more time intervals preceding the activation of the application, an activity of the mobile device.

21. The non-transitory computer-readable storage media of claim 17, wherein the instructions further cause the system to perform operations comprising:

executing, by the application, a second request to an operating system of the mobile device to cache sensor measurements for a predetermined time interval, wherein the predetermined time interval starts after the activation of the application.

22. The non-transitory computer-readable storage media of claim 17, wherein the one or more sets of data comprises a set of activity data and wherein the instructions further cause the system to perform operations comprising:

receiving one or more sets of sensor data for a third time interval that begins prior to a beginning of the first time interval and ends after an end of the first time interval, the one or more sets of sensor data being stored in association with an indication of the trip, and wherein an interval between a beginning of the third time interval and the beginning of the first time interval may be dynamically determined based on one or more previous trips or previously collected sensor data.

23. The non-transitory computer-readable storage media of claim 17, wherein the one or more sets of data comprises one or more sets of sensor data, wherein the instructions further cause the system to perform operations comprising:

generating, from the one or more sets of sensor data, a set of sensor signals;

extracting from the set of sensor signals one or more statistical features; and executing a classifier using the one or more statistical features to generate a prediction of a vehicle speed during the trip.

24. The non-transitory computer-readable storage media of claim 17, wherein the instructions further cause the system to perform operations comprising:

determining a first location of the mobile device upon termination of a previous trip and a second location of the mobile device upon activating the application;

determining, from the one or more sets of data, visit data that includes one or more visits occurring during the first time interval; and determining a route of the mobile device over the trip using the visit data, the first location, and the second location.

* * * * *